US006928941B1

(12) United States Patent
Sternitzke

(10) Patent No.: US 6,928,941 B1
(45) Date of Patent: Aug. 16, 2005

(54) DIAMOND ROW PATTERN PLANTER

(75) Inventor: Donald Sternitzke, Albany, GA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 125 days.

(21) Appl. No.: 10/366,115

(22) Filed: Feb. 13, 2003

(51) Int. Cl.$^7$ .............................. A01C 7/00; A01C 9/00
(52) U.S. Cl. ...................................... 111/181; 111/182
(58) Field of Search ....................... 111/174, 177–182, 111/170

(56) References Cited

U.S. PATENT DOCUMENTS

| 4,164,190 | A |   | 8/1979  | Newman |
|-----------|---|---|---------|--------|
| 5,072,676 | A |   | 12/1991 | Pingry et al. |
| 5,205,114 | A |   | 4/1993  | Hobbs |
| 5,429,248 | A | * | 7/1995  | Le Gigan et al. ............ 209/33 |
| 5,765,720 | A |   | 6/1998  | Stufflebeam et al. |
| 6,029,591 | A |   | 2/2000  | Baugher et al. |
| 6,082,275 | A |   | 7/2000  | Schaffert |
| 6,092,476 | A |   | 7/2000  | Wilson |
| 6,173,664 | B1|   | 1/2001  | Heimbuch |
| 6,325,005 | B1|   | 12/2001 | Crabb et al. |
| 6,602,130 | B1| * | 8/2003  | Manning et al. ............ 460/100 |

OTHER PUBLICATIONS

Sternitzke, D.A., et al., "Impact of Plant Spacing and Population on Yield for Single-Row Nonirrigated Peanuts", *Peanut Science*, vol. 27, pp. 52-56, 2000.
Suszkiw, J., "New Peanut Planting System to Boost Yields", *USDA, ARS News & Information Web Page*, www.ars.usda.gov/is/pr/2001/011119.htm , Nov. 19, 2001.

* cited by examiner

*Primary Examiner*—Christopher J. Novosad
(74) *Attorney, Agent, or Firm*—John D. Fado; Gail E. Poulos

(57) ABSTRACT

A device for planting seeds in a uniform, staggered, diamond-shaped manner promotes thicker faster spreading canopies that help keep the soil bed cool, moist and better protected from erosion, improved weed control, and improved yield.

12 Claims, 27 Drawing Sheets

(6 of 27 Drawing Sheet(s) Filed in Color)

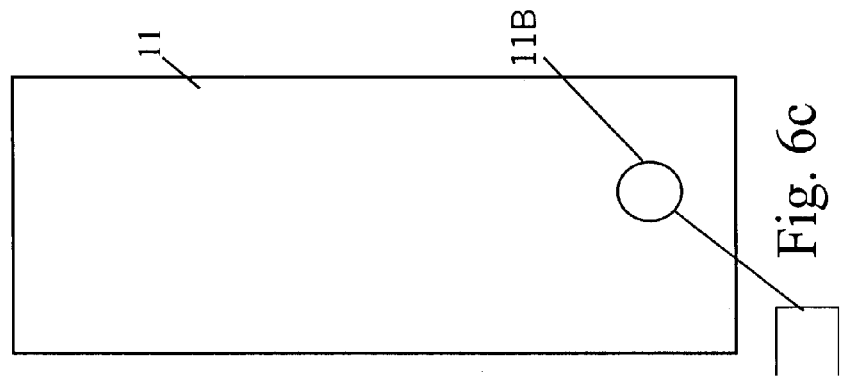
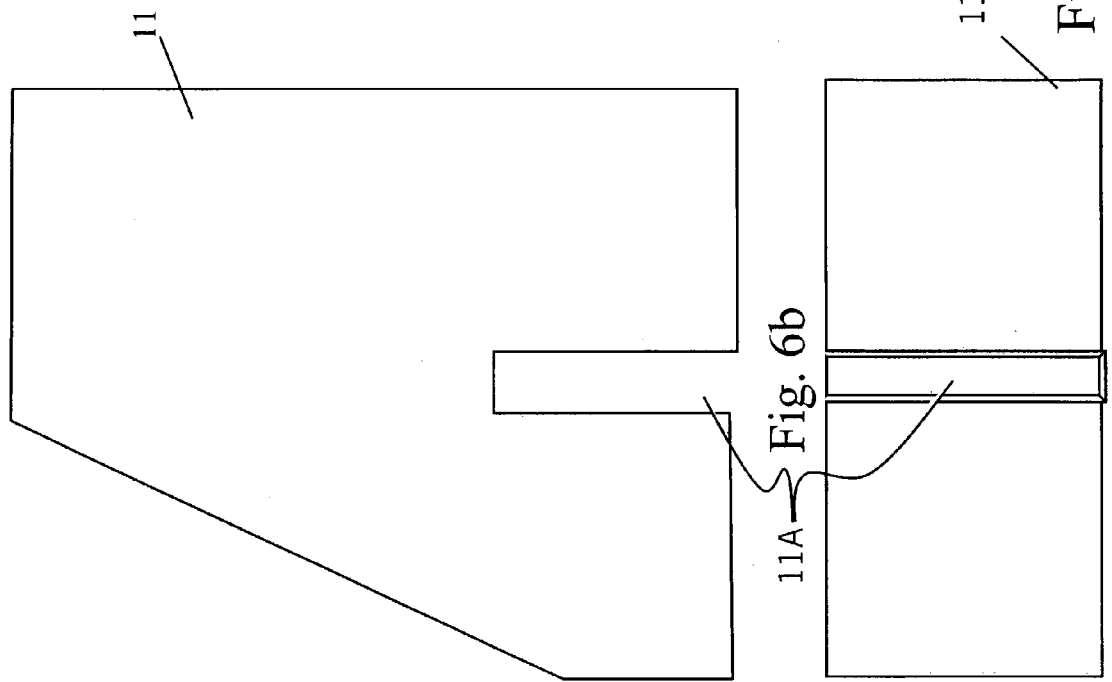
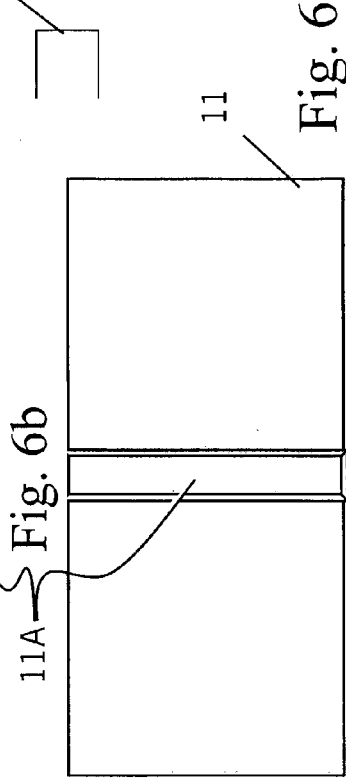
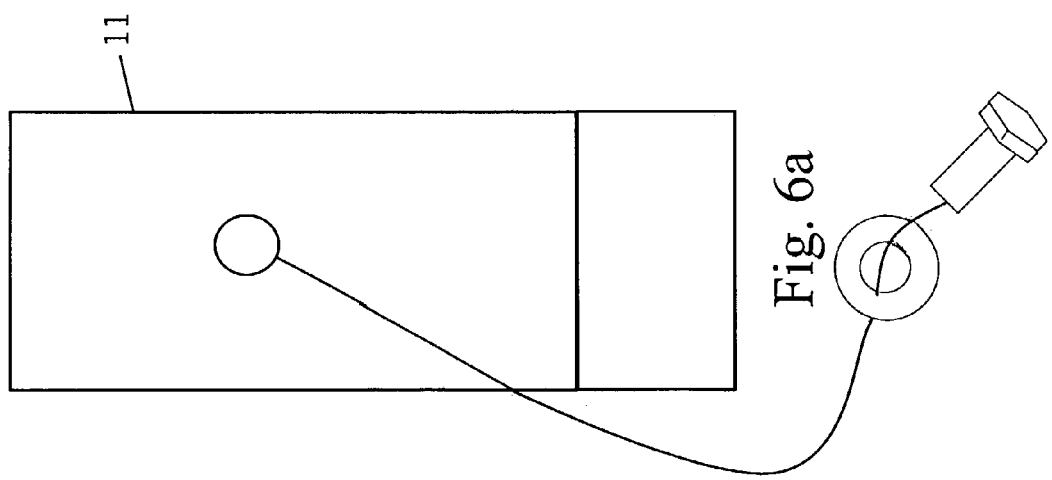

DIAMOND ROW PATTERN PLANTER

BACKGROUND OF THE INVENTION

1. Field of the Invention

This invention relates to a device and a method for using the device to plant seeds in a diamond-shaped pattern in order to obtain higher yields, accelerated canopy coverage, water savings, and herbicide savings.

2. Description of the Related Art

Planter devices have been in use for years and are for planting seeds in single or double rows. Typically a planter device includes a storage bin for storage of seed and uses a singulation system connected to the storage bin. A length of tube generally transports the singulated seed to a furrow.

Plant population, plant spacing, and yield are thought to be interrelated and these relationships need to be quantified to help growers predict yield. Spacing plants in a uniform, staggered manner promotes thicker, faster-spreading canopies that help keep the soil bed cool, moist, and better protected from erosion. Improved weed control is another benefit.

For peanuts, for example, producers in the southern United States commonly plant runner-type peanuts at a rate of approximately 20 seed/m on about 0.91 m row widths (Wehtje et al., Peanut Science, Volume 21, 16–19, 1994). The relatively high seeding rate is used as a hedge against poor emergence with the hope of attaining approximately four plants/30 cm on 0.91 m rows (Baldwin, University of Georgia Extension Service, Bulletin 1146, 1997). Higher seeding rates offer the additional benefits of (a) accelerated canopy coverage (Mozingo and Wright, Peanut Science, Volume 21, 5–9, 1994), (b) enhanced weed suppression (Hauser and Buchanan, Peanut Science, Volume 8, 74–81, 1981; Buchanan et al., In: H. E. Pattee and C. T. Young eds., Peanut Science and Technology, American Peanut Research Education Society, Inc., Yoakum, Tex., 206–249 1982), and (c) reduced tomato spot wilt virus severity (TSWV) (Brown et al., Peanut Update, University of Georgia Cooperative Extension Service Publication CSS-97-06, 1997).

Poor plant emergence, associated with inferior seed quality, pests, or adverse environmental conditions reduces plant populations and often leads to reduced yield and economic returns. Farmers trying to recapture an expected loss in income by replanting sometimes lose even more income because replanting costs may exceed the financial benefits of greater yield.

The impact of population as determined by various row and plant spacings on peanut yield has been reported with mixed results. A three year experiment in Oklahoma compared pod yields of the Spanish-type peanut Argentine on 0.25, 0.5, 0.75 and 1-m rows using 12.5, 6.7, and 3.1-cm seed spacing (Chin Choy et al., 1982). Highest yields for both irrigated and rain-fed treatments were associated with the narrowest (0.25 m) row spacing. In a study of five cultivars, it was reported that the closest (5.1 cm) seed spacing produced greater yields than 15.2 cm on 91-cm rows (Mozingo and Steele, 1989). A 2-year study (Igbokwe and Nkongolo, 1996) in Mississippi reported the effect of 10.2, 15.2, and 20.3-cm seed spacing on yield for cv. Alcon Pat using 1.07 rows. Greatest yield was associated with the 15.2-cm treatment as opposed to the narrowest rows. In another study, three of six cultivars had a significant yield increase when spacing was decreased from 30.5 to 10.2 cm/seed on 91-cm rows (Knauft et al., 1981). However, no significant yield difference was reported when spacing decreased from 15.2 to 10.2 cm.

Other studies observed diminishing yield when the population passed a critical saturation spacing. Yield of the cv. Florunner planted at 19.6, 11.9, 8.4, 6.6, and 5.3 cm/seed on 0.9-m rows progressively increased as seed spacing decreased from 19.6 to 6.6 cm/seed (Wehtje et al., 1994). However, a further reduction in seed spacing from 6.6 to 5.3 cm/seed reversed the positive trend in yield. Yield decreased when the plant population became too high. Apparently, excessive interplant competition for water, nutrients, and light reduced yield.

The relationship of plant spacing and population on grade is unclear. Knauft et al. (1981) reported five of six cultivars showed no significant difference in grade with changing population. In contrast, mozingo and Wright (1994, supra) reported significantly greater numbers of sound mature kernels (SMK), total kernels (TK), and lower other kernels (OK) for six Virginia-type cultivars associated with more compact planting patterns. Chin Choy (1982, supra) reported the highest quality was associated with 6.7 cm rather than 3.1-cm or 12.5-cm plant spacing.

Evidence highlighting the impact of plant competition expressed as the dependency of yield per plant on population has been reported for other crops. Bakelana and Regnier (1991) studied domestic oat (*Avena sativa* L.) and reported crop dry matter, leaf area, and tiller number per plant increased when population decreased. Zadeh and Mirlohi (1998) reported rice (*Oryza sativa* L.) yield per unit area was less but grain yield per plant was more when population was reduced.

Examples of planter devices include U.S. Pat. No. 4,628,841 to Powillet; U.S. Pat. No. 4,650,093 to Meyer-Bosse; U.S. Pat. No. 4,515,291 to Holmes; U.S. Pat. No. 4,928,607 to Luigi; U.S. Pat. No. 5,058,766 to Deckler; U.S. Pat. No. 5,632,212 to Barry; U.S. Pat. No. 5,351,634 to Patton; U.S. Pat. No. 4,449,642 to Dooley; U.S. Pat. No. 4,029,028 to Griffiths, U.S. Pat. No. 4,008,826 to Caree, and U.S. Pat. No. 6,173,664.

U.S. Pat. No. 4,164,190 to Newman discloses the use of a planting method to improve productivity of cereal grains and grasses. The patent discloses planting seeds in a diamond-shaped pattern with longitudinal and transverse rows of seed planting sites in which the transverse rows cross the longitudinal rows. The device uses a seed-to-seed spacing of 1 to 3½ inches along both the longitudinal and transverse rows. The disclosed device is a roller which includes a plurality of shaped projections which create an array of shallow holes in the ground arranged in the diamond-shaped pattern. After rolling, a seed drop device drops seeds into each of the holes.

While various devices are known in the art for planting seeds in order to improve yield, there still remains a need in the art for a device for planting seeds to obtain increases in production. The present invention, as described below, is different from related art devices and methods.

SUMMARY OF THE INVENTION

It is therefore an object of the present invention to provide a device for planting seeds in multiple off-set rows, i.e. diamond-shaped, to obtain greater yield, accelerated canopy coverage, water savings, and herbicide savings.

Another object of the present invention is to provide a device for planting seeds in multiple off-set rows, i.e. diamond-shaped, which includes a common seed hopper and a single rotating cylinder.

Another object of the present invention is to provide a device for planting seeds in multiple off-set rows, i.e.

diamond-shaped, which includes a hopper assembly having central perpendicular supports, perpendicular stationary supports, a baffle and brush system, a seed access port, shrouds for seed containment, and a seed drain access port, and dividers for guiding seeds to a rotating cylinder containing cylinder holes.

A still further object of the invention is to provide a device for planting seeds in multiple off-set rows, i.e. diamond-shaped, which has a single rotating cylinder containing a plurality of rows of holes and impeding-like material between said holes.

A still further object of the present invention is to provide a device for planting seeds in multiple off-set rows, i.e. diamond-shaped, which has a baffling system for controlling seed flow to a single rotating cylinder including primary sliding gates and secondary sliding gates.

Another object of the present invention is to provide a device for planting seeds in multiple off-set rows, i.e. diamond-shaped, which includes a brush assembly wherein there are two brushes per row of cylinder holes and tabs on a rotating cylinder to facilitate seed transfer from a seed hopper to the cylinder holes on a rotating cylinder.

A still further object of the present invention is to provide a device for planting seeds in multiple off-set row, i.e. diamond-shaped, which includes a seed detachment system wherein the system has a seed contact disloging strip and a cleaning system to remove any seed fragments remaining in cylinder holes on a rotating cylinder wherein the cleaning system includes a cleaning unit made up of hole cleaners attached to each side of a nut, hole cleaner lever arm, a hole cleaner lever arm spring, a cotter pin, and a hole cleaner lever arm support.

Another object of the present invention is to provide a method for planting seeds in multiple off-set rows, i.e. diamond-shaped, wherein seeds are loaded into a hopper assembly which directs seeds to a rotating cylinder with cylinder holes using a baffle and brush system.

A still further object of the present invention is to provide a method for planting seeds in multiple off-set rows, i.e. diamond-shaped, that includes the steps of detaching seeds from the cylinder holes on the rotating cylinder using a seed detachment system and cleaning the cylinder holes of any remaining seeds or seed fragments using a cleaning system that includes a cleaning unit made up of hole cleaners attached to the sides of a nut, a hole cleaner lever arm spring, a hole cleaner lever arm support, and a hole cleaner support.

Further objects and advantages of the invention will become apparent from the following description.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 4a shows tab 8, cylinder hole 12, cylinder 13, end cap with housing 15, drive shaft 16, bearing 17, bearing housing 18 with housing hole 18a; and FIG. 4b shows strip 9, strip support 10 with slot 10a, trangular-shaped strip support 11 with notch 11a, seed duct 14, support 19 with holes 19a, and seed drop tube 20.

FIGS. 6a–6d show front view (6a) side view (6b), back view (6c) and bottom view (6d) of strip support 11 showing notch 11a in 6b and 6d.

FIG. 23a shows peanut plants in a single row, seeds planted at 12 seeds per foot at 20 days after planting. FIG. 23b shows peanut plants in twin rows, seeds planted 12 seeds per foot, 25 days after planting. FIG. 23c shows peanuts plants in diamond-shaped rows, seeds planted 12 seeds per foot, 26 days after planting.

FIG. 24a shows peanut plants in single rows, seeds planted at 12 seeds per foot at 36 days after planting. FIG. 24b shows peanut plants in twin rows, seeds planted 12 seeds per foot, 41 days after planting. FIG. 24c shows peanuts plants in diamond-shaped rows, seeds planted 12 seeds per foot, 42 days after planting.

DETAILED DESCRIPTION OF THE INVENTION

While the device of the instant invention can be used with a variety of furrow openers, it will be described as used with a double disk furrow opener.

An agricultural planter typically includes a number of planter row units mounted on a main frame. The planter is pulled in a forward direction by a tractor. Each row unit forms a seed furrow, deposits seeds, and then closes the seed furrow to form a seed bed that is either a single row or twin row (FIGS. 22, 23a, 23b, 24a, and 24b). The present invention, device 100, however, plants seeds in staggered diamond-shaped patterns FIGS. 22,23c, and 24c).

Figure 15B:
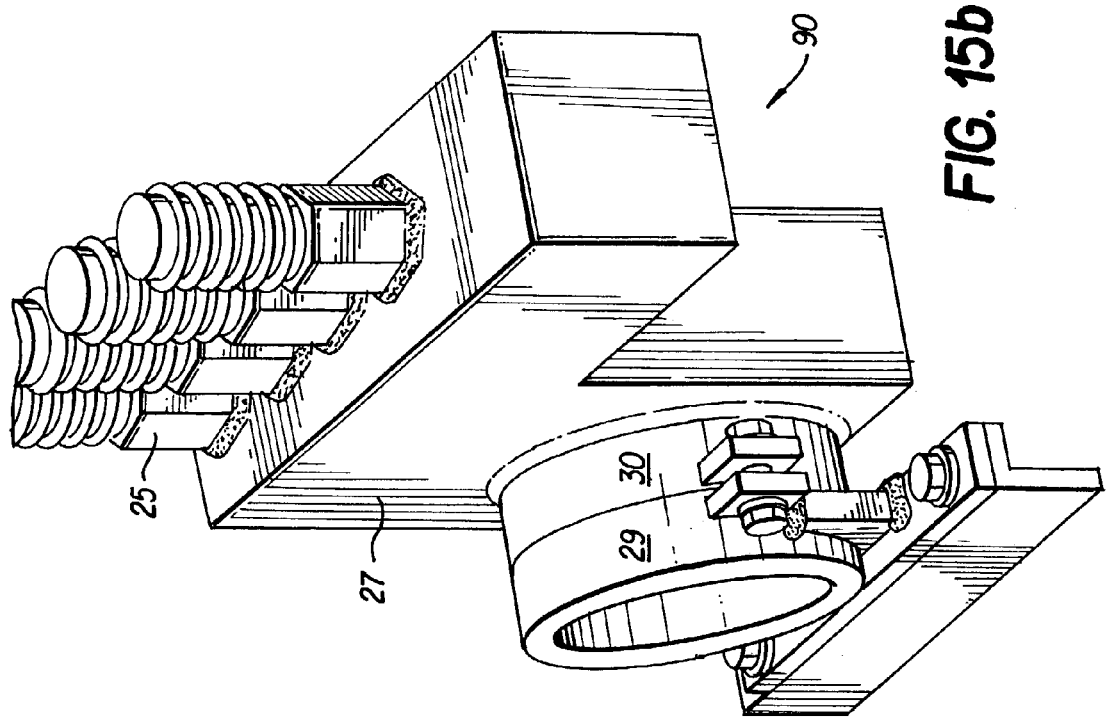
FIGS. 15a and 15b are drawings showing the front right (FIG. 15a) and front left (FIG. 15b), respectively, of a portion of vacuum assembly 90 including barbed hose fittings 25 and vacuum chamber manifold 27 in both FIGS. 15a and 15b. Bearing housing 29, and vacuum manifold converter 30 shown in FIG. 15b only.
Figure 15A:
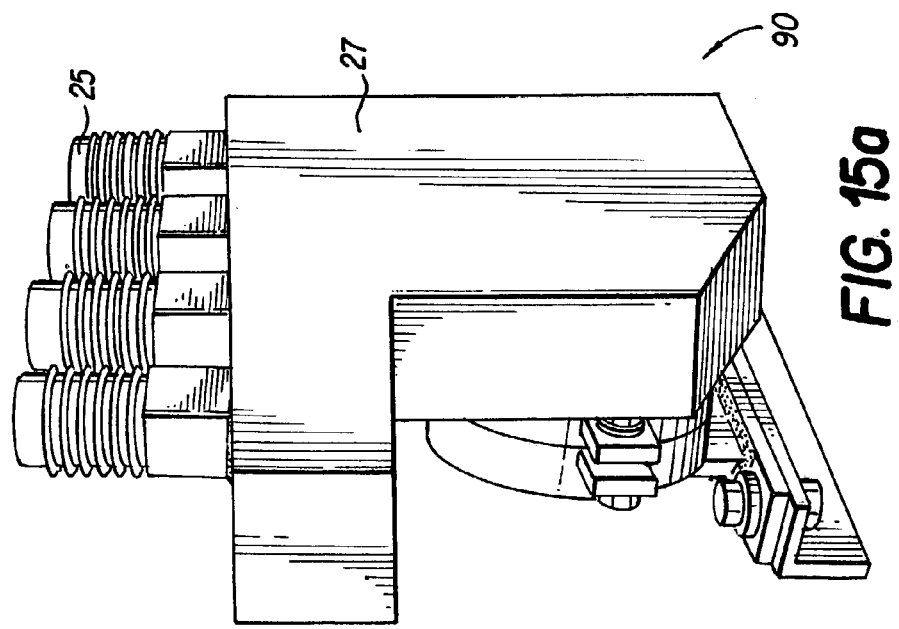
Figure 19:
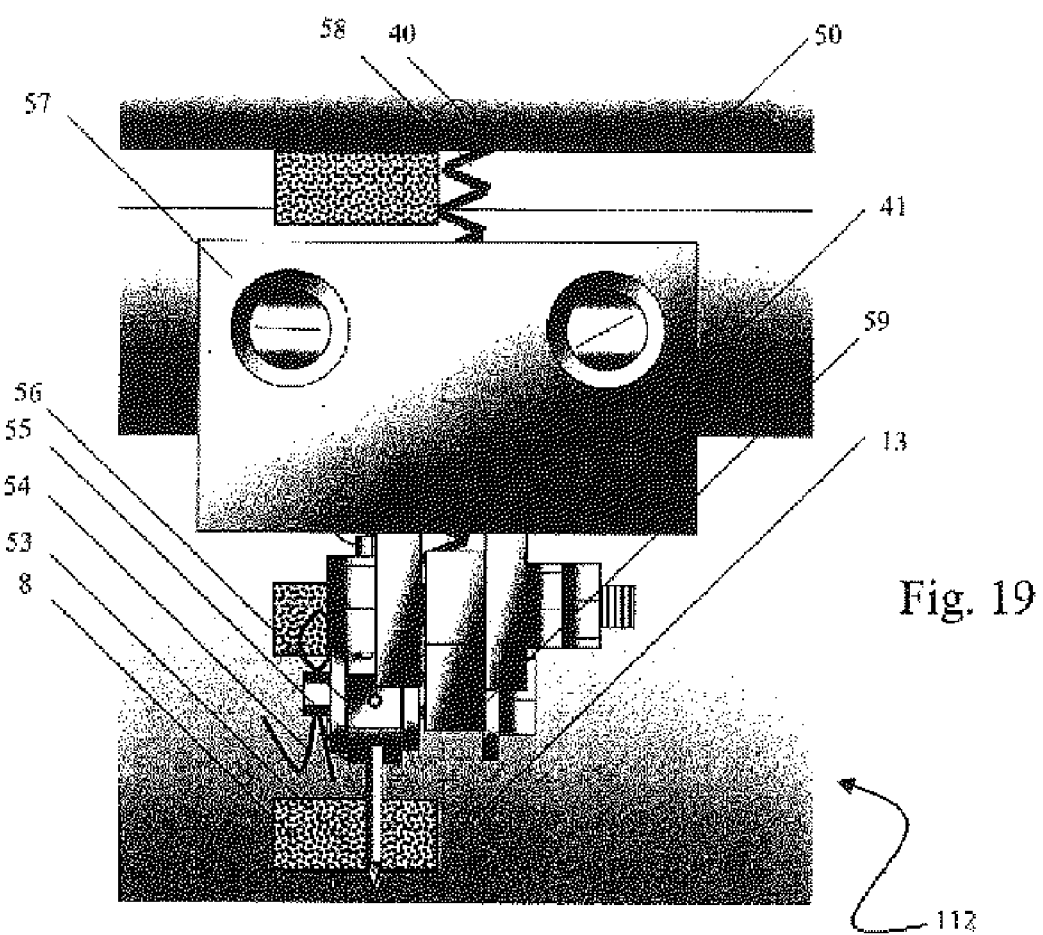
FIG. 19 is a drawing showing cleaning unit 112 including hole cleaner support 41, hole cleaner 53, cotter pin 54, bolt 55, nut 56, hole cleaner lever arm support 57, hole cleaner lever arm spring 58, and hole cleaner lever arm 59. The drawing also shows tab 8, pick-up and transfer cylinder 13, hole cleaner spring hole 40, and bottom plate support 50.
Figure 20:
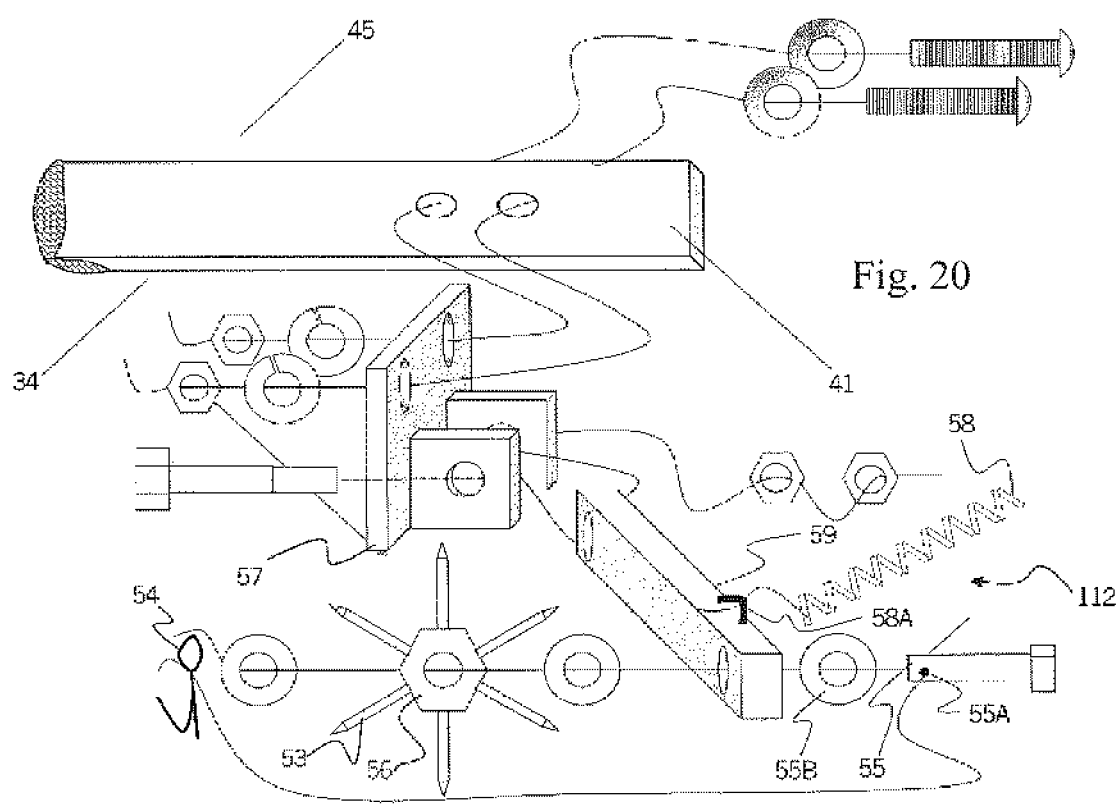
FIG. 20 is an exploded view of cleaning unit 112 showing support 34, hole cleaner supports 41 and 45, hole cleaner 53, cotter pin 54, bolt 55, hole 55a, washer 55b, nut 56, hole cleaner lever arm support 57, hole cleaner lever arm spring 58, means for removeably securing hole cleaner arm spring 58a, and hole cleaner lever arm 59.
Figure 22:
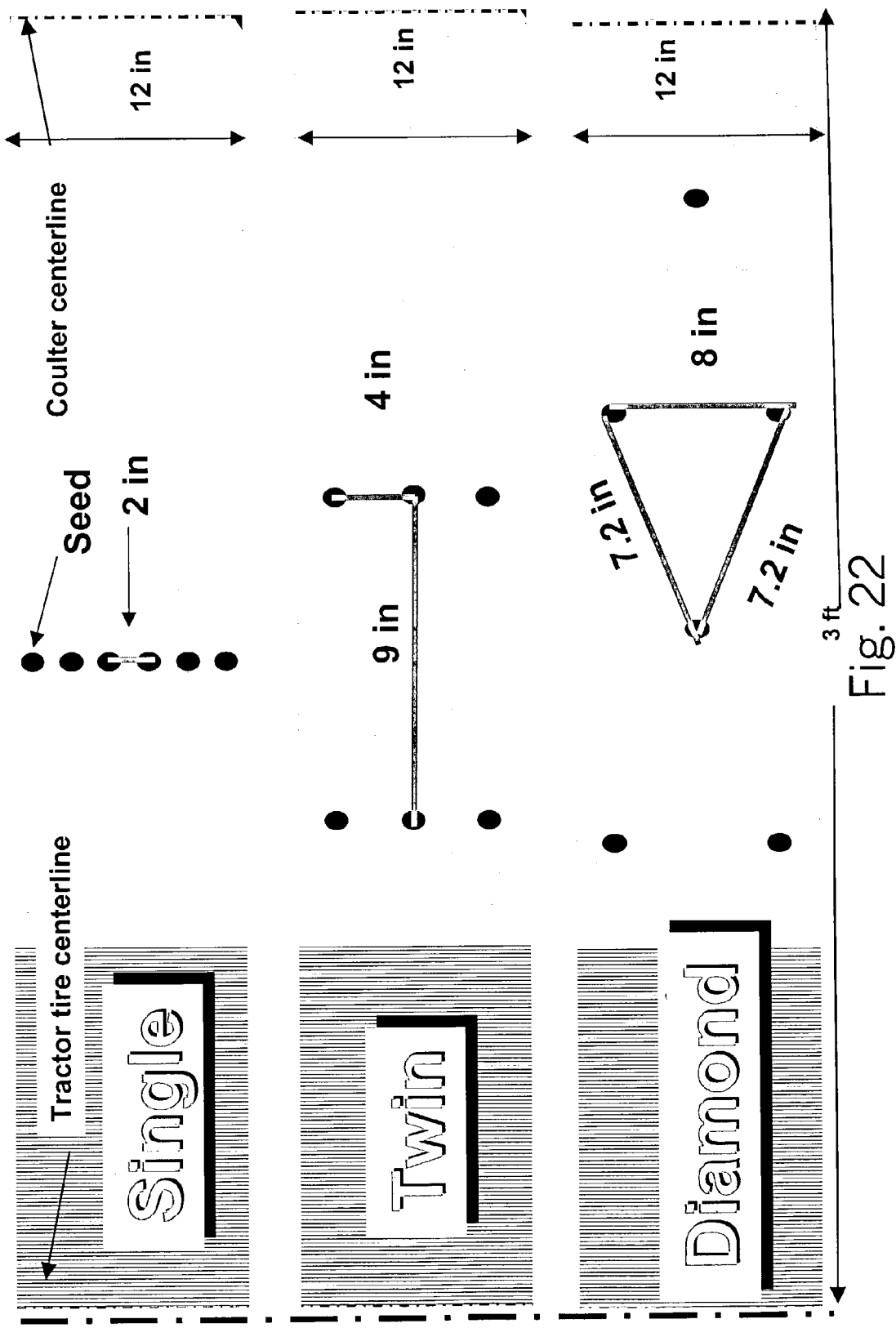
FIG. 22 is a drawing comparing prior art single and twin row planting patterns with distance between seeds to the diamond-shaped planting pattern and distance between seeds of the present invention.
Figure 23A:
FIGS. 23a–23c are photographs of peanut plants in a nonirrigated field comparing prior art planting methods of single (23a) and twin rows (23b) with peanuts planted in diamond-shaped rows using the device of the present invention (23c).
Figure 23B:
Figure 23C:
Figure 24A:
FIGS. 24a–24c are photographs of the same peanut plants depicted in FIGS. 23a–23c.
Figure 24B:
Figure 24C:
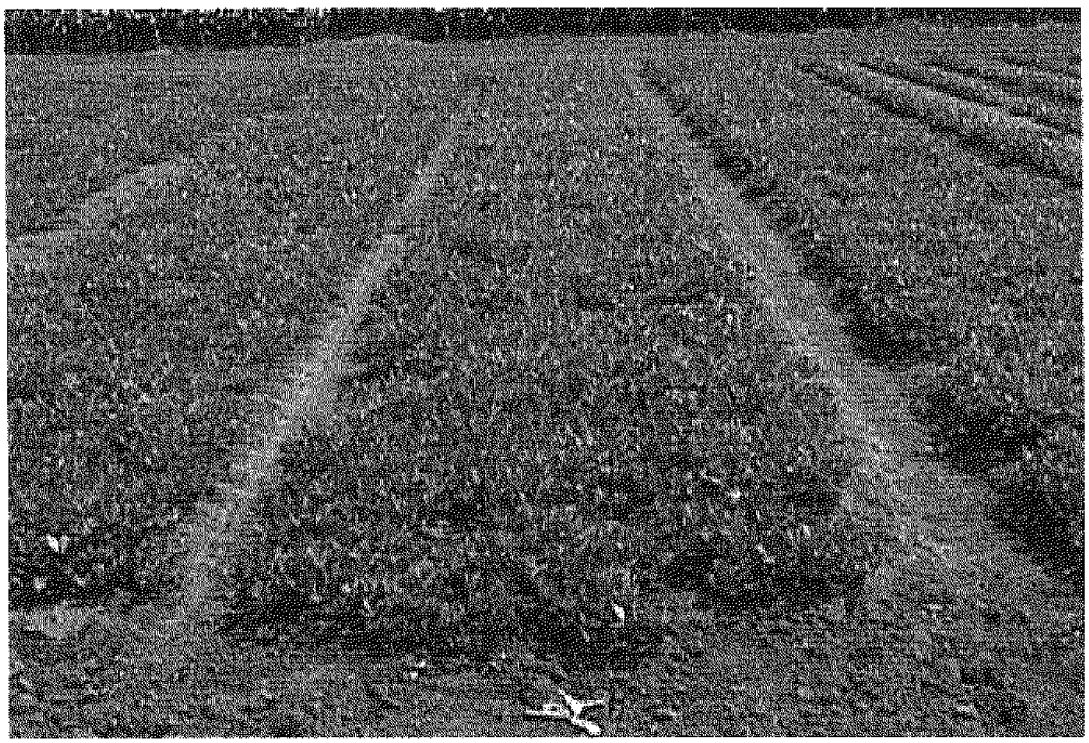

A device 100 (FIGS. 1 and 2) plants seeds in uniform, staggered diamond-shaped patterns which promotes thicker, faster-spreading canopies that help keep the soil bed cool, moist, and better protected from erosion (FIGS. 22, 23c, and 24c). Improved weed control is another benefit. Significantly higher yields are possible when the distance between plants is maximized. Device 100 solves the problems of reduced yield caused by excessive plant competition while devising a mechanized device that can commercially plant seeds in a diamond-shaped pattern. Device 100 (FIGS. 1 and 2) transfers seed at a constant rate from a seed hopper 21 to off-set disk openers (Not shown). Device 100 includes a rotating pick-up and transfer cylinder 13 containing a plurality of cylinder holes 12 arranged in rows, a plurality of tabs 8 located between holes 12, the number of rows corresponding to the number of pairs of offset disk openers. Device 100 includes hopper assembly 60 (FIG. 1); a cylinder assembly 70 which includes pick-up and transfer cylinder 13 (FIG. 2), seed detachment system 80 (FIGS. 1, 2, 4a–d, 5a–c, and 6a–d) a vacuum assembly 90 (FIGS. 15a–b and 16), and a cleaning system 110 (FIGS. 19 and 20).

Figure 1:
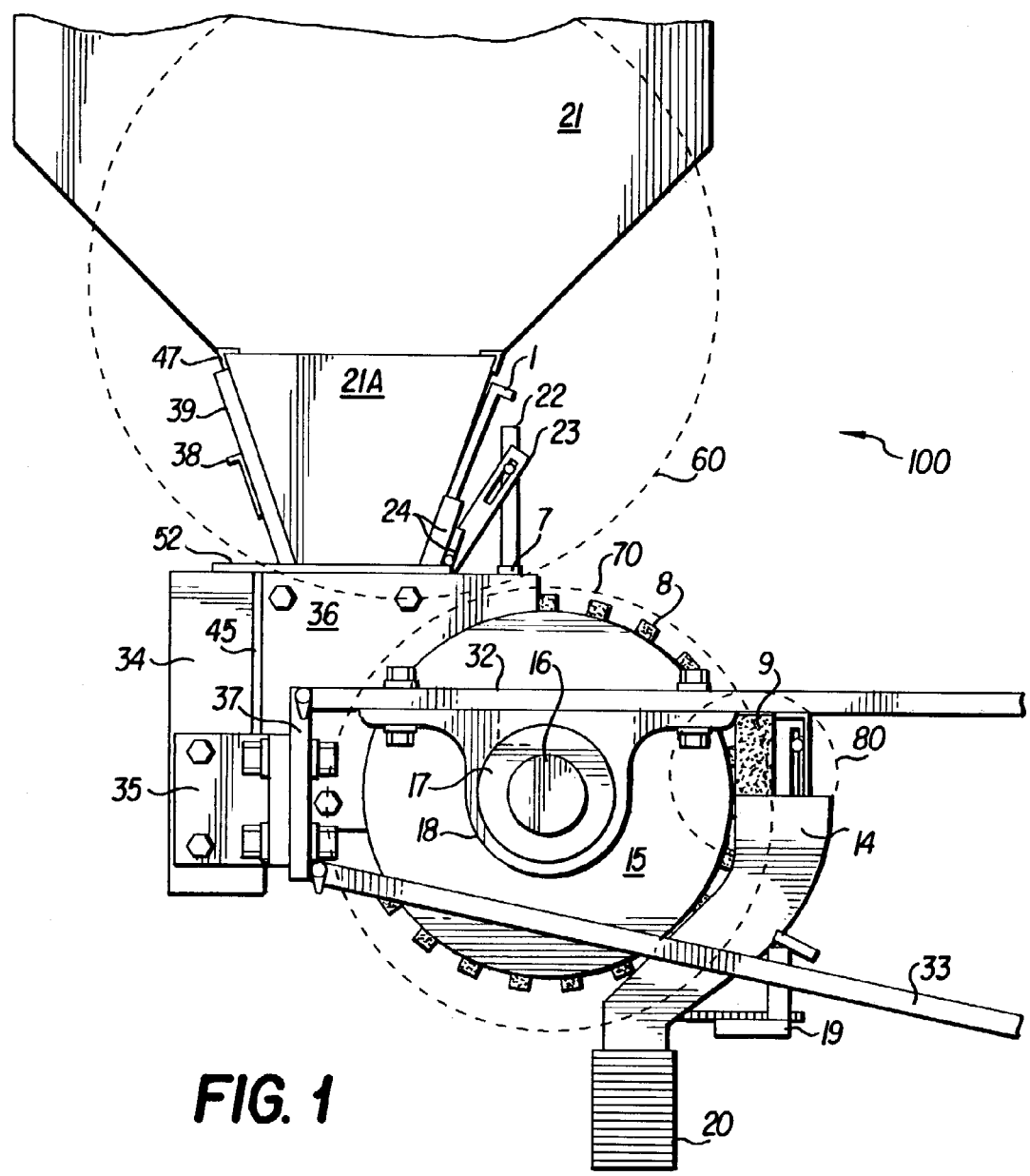
FIG. 1 is a drawing showing a side view of Device 100 including hopper 21, hopper assembly 60, cylinder assembly 70, and seed detachment system 80.
Figure 2:
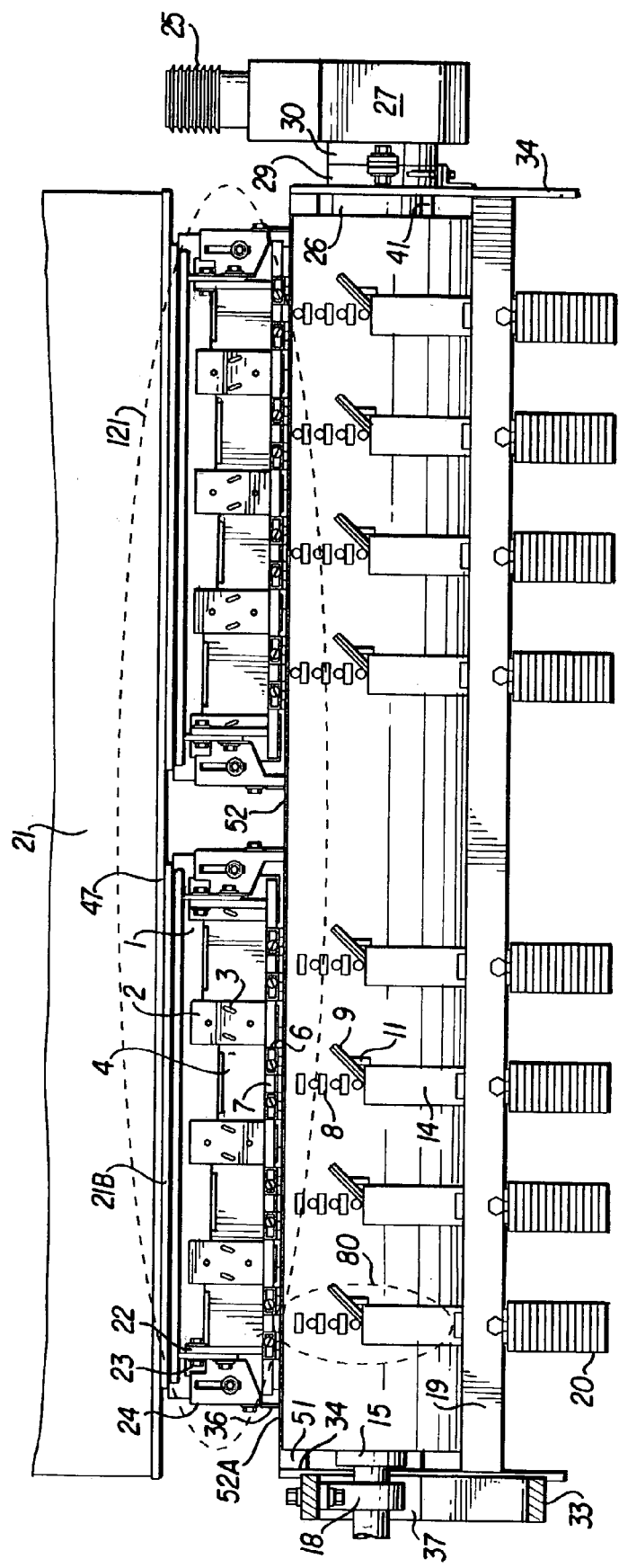
FIG. 2 is a drawing showing a front view of baffle and brush system 121; seed detachment system 80 including tab 8, seed contact dislodging triangular-shaped strip 9, strip support 11, seed duct 14, and seed drop tube 20.
Figure 3:
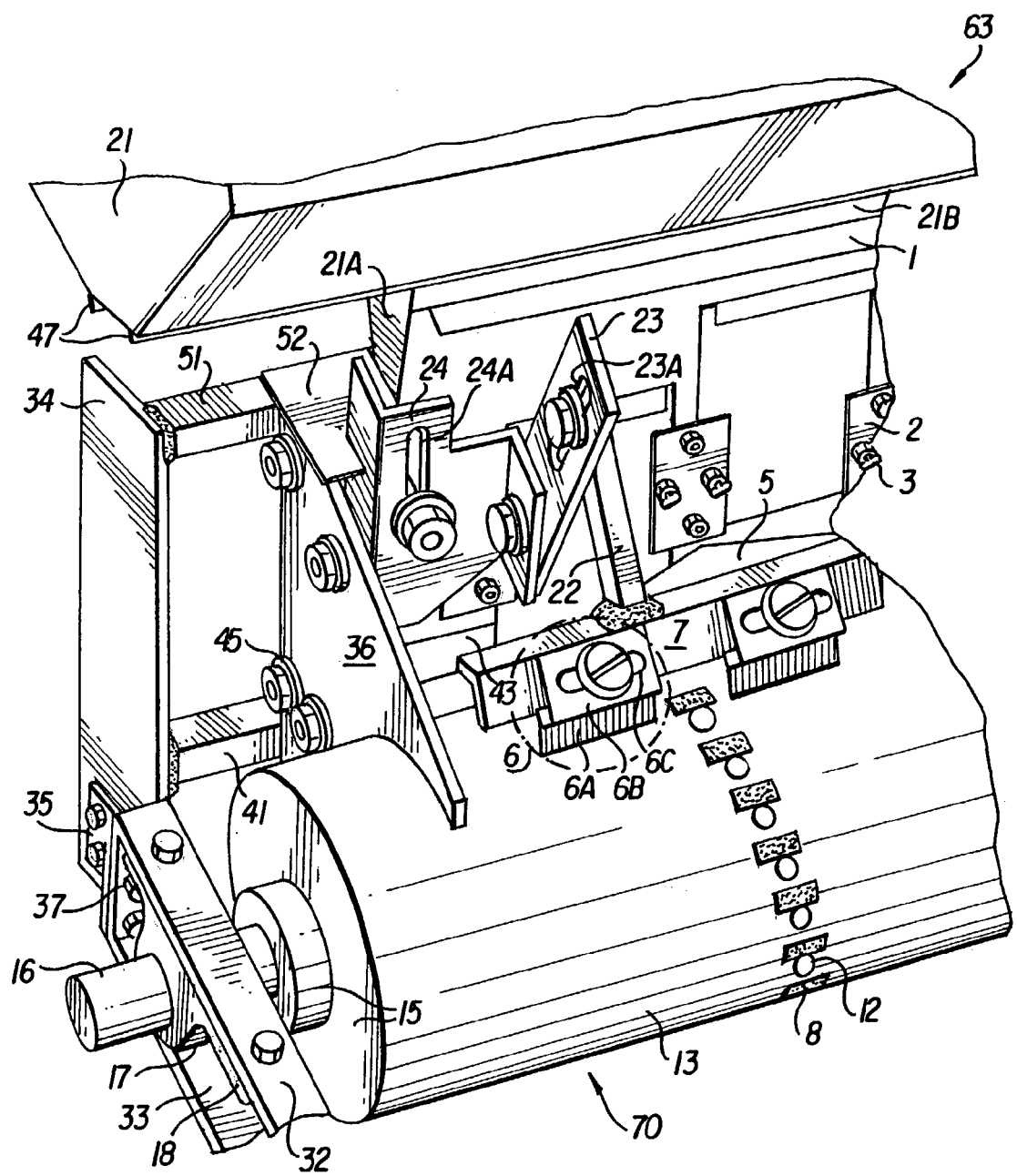
FIG. 3 is a drawing showing detail of cylinder assembly 70 and seed hopper transition assembly 63 including seed hopper 21, central perpendicular supports 21a, perpendicular stationary supports 21b, seed hopper support 47, primary sliding gate 1, secondary sliding gate 4, support 22, support 23, slot 23a, stationary support 2 for sliding gates 1 and 4, divider 5, frame 6b, slot 6c, tab 8, cylinder hole 12, bristle 6a, nylon brush support 7, pick up and transfer cylinder 13, and supports 32, 34, and 35, and shroud for seed containment 36.
Figure 21:
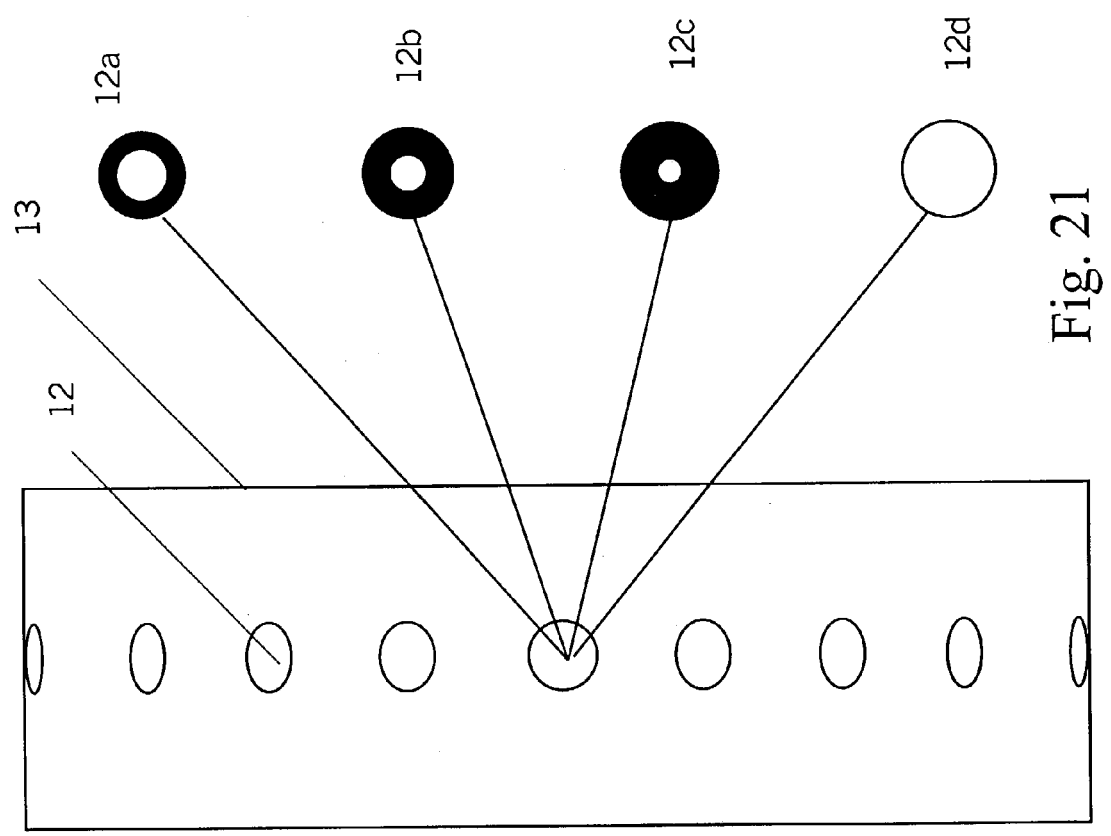
FIG. 21 is a drawing showing grommets 12a for peanuts, 12b for soybeans, 12c for cotton, and 12d to plug cylinder hole 12 on pick-up and transfer cylinder 13 (both depicted).

Cylinder assembly 70 (FIGS. 1–4b, 11, 17, and 18) is the pick-up and transfer mechanism actuated by vacuum assembly 90 (FIGS. 2, 15a–b, 16, 17, 18), and drive shaft 16 (FIGS. 1, 3, 4a, 17, and 18). Drive shaft 16 transfers a constant rate of seed from seed hopper 21 to pairs of offset disk openers. Cylinder assembly 70 includes pick-up and transfer cylinder 13, endcap with endcap housing 15, tabs 8, cylinder holes 12, drive shaft 16, bearing 17, bearing housing 18, and mounting support 32 (FIGS. 1–3). Pick-up and transfer cylinder 13, a perforated clockwise rotating cylinder 13 operating under a vacuum, picks up seed (one for each pair of disk openers (not shown). Seeding rate is adjusted by changing the sprocket settings running from the planter drive wheel (not shown) to drive shaft 16. When the planter moves forward the sprockets engage pick-up and transfer cylinder 13 which causes it to rotate. As pick-up and transfer cylinder 13 rotates, seed contact dislodging strips 9 cause the cylinder-to-seed vacuum to be broken and seeds are planted in a diamond pattern after falling down seed drop tubes 20 attached to double disk openers (not shown) (FIGS. 2, 4*a*–*b*, and 5*a*–*c*). Pick-up and transfer cylinder 13 is about a 6 inch diameter pipe approximately 45 inches in length. Cylinder 13 has a total of about 144 cylinder holes 12 of approximately 7/32 inch diameter which were drilled at equal intervals in eight rows around the circumference of cylinder 13 using a vertical mill. Cylinder holes 12 are countersunk to augment seed pickup. Pick-up and transfer cylinder 13 is made of any durable material such as PVC or stainless steel, for example. Attached to rotatable cylinder 13 are tabs 8 made of any impeding-like material which will improve seed flow to holes 12, such as for example a hook-or-loop fastening material such as is widely available under the trademark VELCRO. Tabs 8 can be of any size suitable facilitate movement and position a single seed onto cylinder hole 12 which is under vacuum pressure. For example, for peanuts, tabs 8 are about ¾" long and about ½" wide. The determination of the size of tab 8 is well within the ordinary skill in the art given the description of the present invention. Any means for attachment, such as a chemical- and/or water-resistant adhesive, can be used to apply tabs 8 to cylinder 13. The determination of the means for attachment is well within the ordinary skill in the art. Tabs 8 are arranged in rows between cylinder holes 12, the position of each row and number of rows corresponding with the position and number of offset disk openers. Tabs 8 are applied immediately behind the beveled edge of countersunk cylinder holes 12. Cylinder holes 12 are located as described for tabs 8. Given the description of the present invention, one of ordinary skill in the art could readily determine the placement and size of cylinder holes 12. By drilling oversized holes 12, grommets may be used to match hole size with seed size. Grommets 12*a*, *b*, or *c* are inserted into holes 12 to vary the size of hole 12 to accommodate different seed types such as peanut (Grommet 12*a*), soybean (Grommet 12*b*), cotton (Grommet 12*c*), etc. (FIG. 21). A plug grommet 12*d* can be used to block cylinder hole 12 for altering seed spacing or row elimination. Pick-up and transfer cylinder 13 is driven by drive shaft 16. In one application (not shown), a 28-tooth sprocket is attached to drive shaft 16. A size 50 chain runs from the 28 tooth sprocket to an 18-tooth sprocket on the planter's drive wheel. Any combination of chains, jackshafts, gears, or belts can be used to turn pick-up and transfer cylinder 13. It is well within the ordinary skill in the art to determine a mechanism to drive pick-up and transfer cylinder 13. Regardless of drive type, it is crucial that the centrifugal force on pick-up and transfer cylinder 13, created by the rotation of pick-up and transfer cylinder 13, does not exceed the vacuum force holding the seed to the pick-up and transfer cylinder 13. Drive shaft 16 fits into end cap with end cap housing 15 located at the end of pick-up and transfer cylinder 13. It is secured by two set screws. Bearing 17 is fitted over the outside end of shaft 16. Bearing housing 18 is fitted over bearing 17 and attaches to mounting support 32 using threaded bolts and nuts inserted into housing holes 18*a* and holes in support 32 (FIGS. 1–4*a*). Mounting support 32 is made of any durable material such as for example low carbon steel. Mounting support 32 is welded to support 37 (FIGS. 1 and 3). The outside end of drive shaft 16 is connected to a sprocket that is connected by a chain to the planter drive wheel as discussed above. Cylinder end cap with end cap housing 15 is inserted into cylinder 13 to retain a vacuum and is secured using any means known in the art such as, for example, a washer and threaded screw.

Figure 4A:
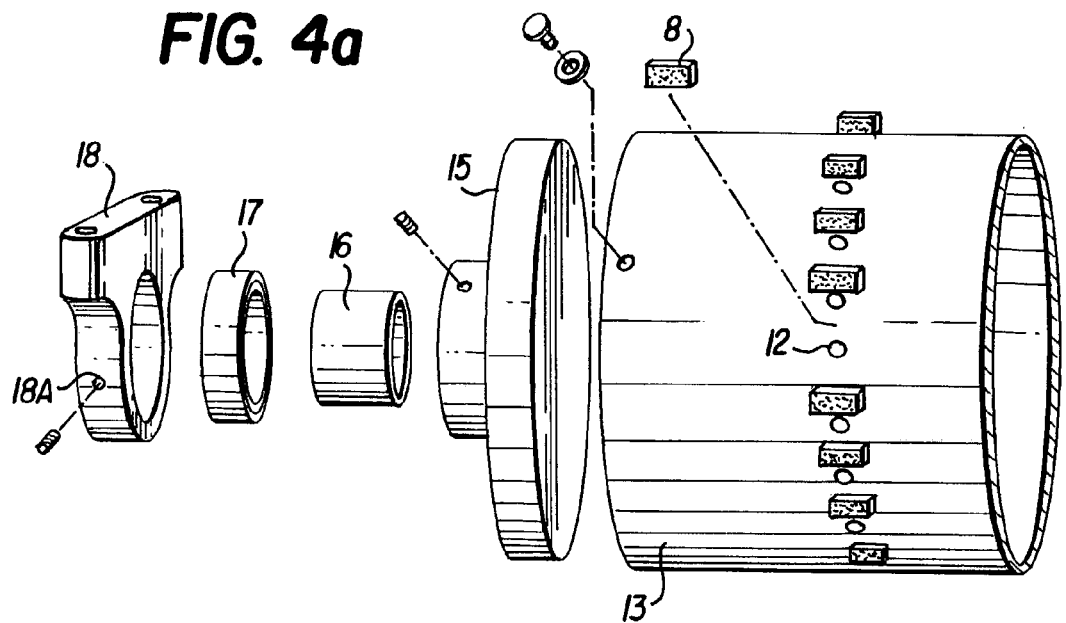
FIGS. 4a and 4b are exploded views of one end of cylinder assembly 70 (FIG. 4a) and seed detachment system (FIG. 4b).
Figure 4B:
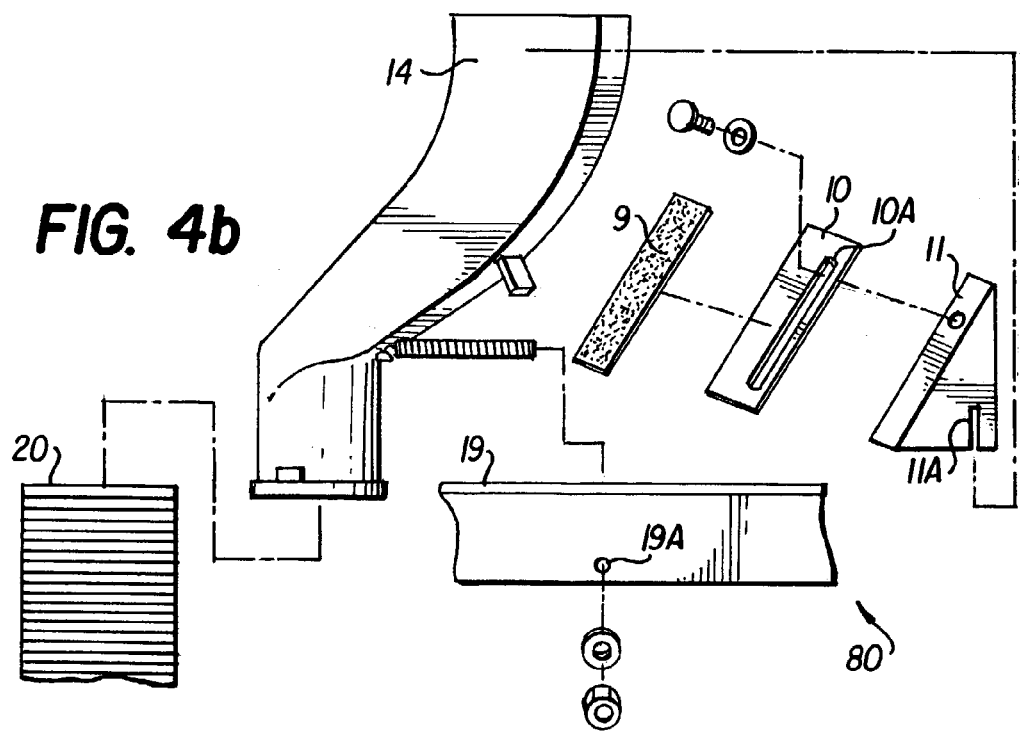
Figure 5A:
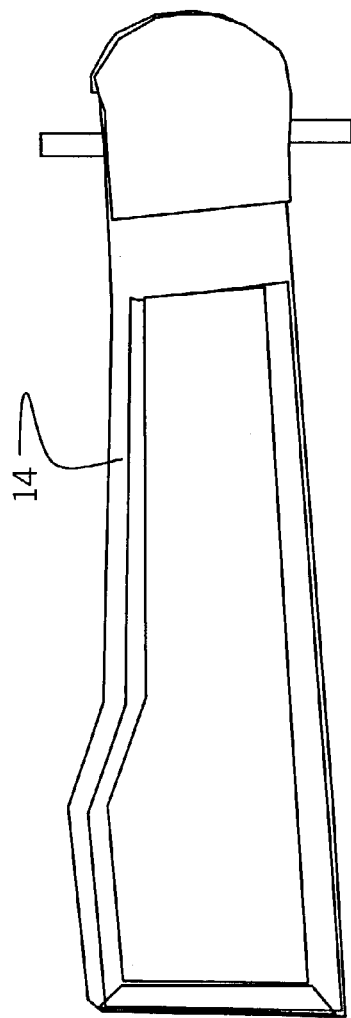
FIGS. 5a–5c show top view (5a), side view (5b) and back view (5c) of seed duct 14.
Figure 5B:
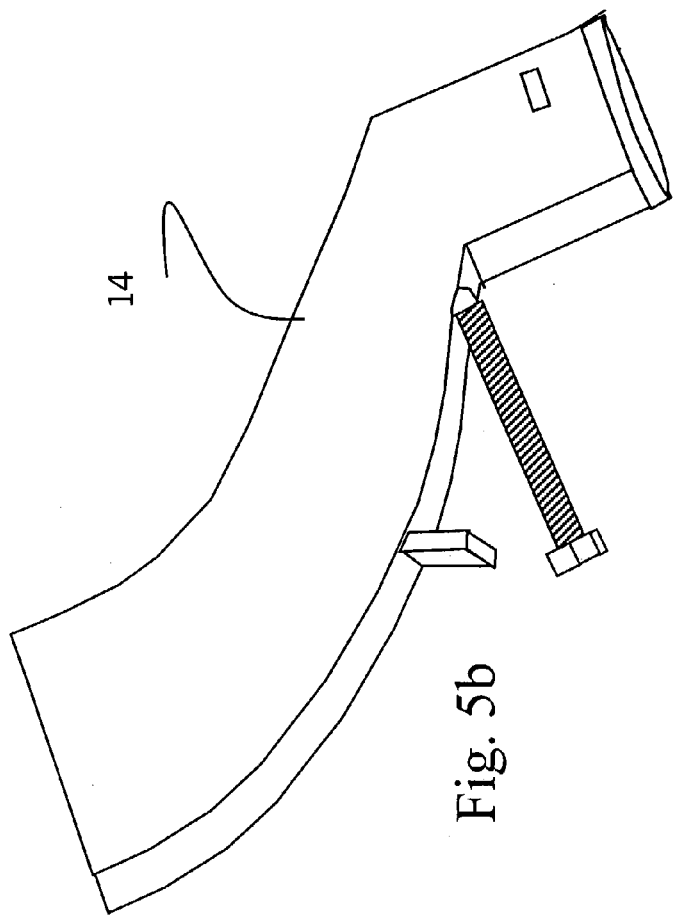
Figure 5C:
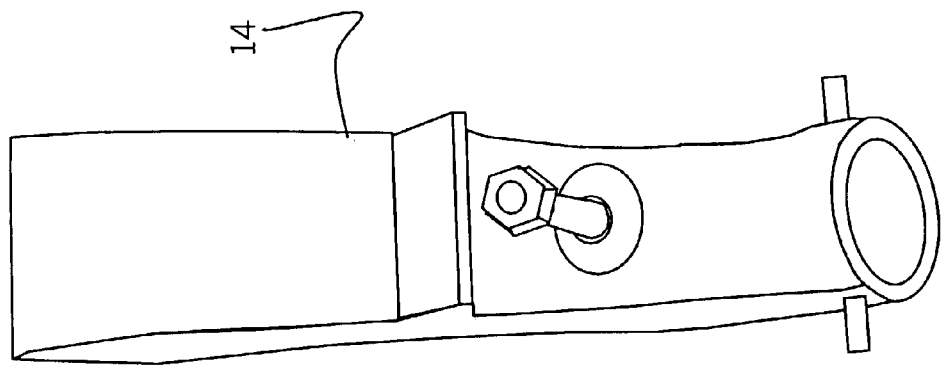

Seed pick-up and transfer occurs when seeds become attached to cylinder holes 12, that are under a vacuum, and rotating pick-up and transfer cylinder 13 guides them via a seed duct 14 to off-set disk openers (not shown) (FIGS. 1–2). Seed Detachment System 80 includes a seed contact dislodging strip 9 (FIG. 4*b*) made of an impeding-like material, such as for example a hook-or-loop fastening material such as is widely available under the Trademark VELCRO, to dislodge seed from cylinder holes 12 which are under a vacuum. Seed contact dislodging strip 9 is secured to triangular-shaped strip support 11 (FIGS. 4*b*, and 6*a*–6*d*) by strip support 10 which includes a slot 10*a* of about ⅜ inch by about 2 inches on the outside edge for adjusting the position of said strip 9. Strip support 10 is removably attached to strip support 11 through a threaded screw and washer. Strip 9 is removably held in place by an adhesive to strip support 10 and can be adjusted by moving strip support 10 up or down. Strip 9 can be of any size or shape which will dislodge seed from cylinder holes 12. One of ordinary skill in the art could readily determine a size and/or shape for strip 9 given the description of the present invention. Triangular-shaped strip support 11 has a notch 11*a* at its base for removably mounting support 11 to the top edge of seed duct 14. Triangular-shaped strip support 11 is secured to seed duct 14 (FIGS. 5*a*–5*c*) using a set screw placed through a threaded hole 11*b* at the base of strip support 11. Seed duct 14 is made of any durable material, such as for example mild steel sheet metal, plastic, aluminum, etc., and can be of any shape which allows seeds to be guided to seed drop tubes 20 (FIGS. 1, 2, and 4*b*). Seed duct 14 is removably secured to support 19 using a threaded screw and washer. Support 19 is made of any durable material, such as mild steel, aluminum, plastic, sheet metal, etc., and runs the length of pick-up and transfer cylinder 13 (FIG. 2). Holes 19*a* are drilled along the length of support 19 and the positions of holes 19*a* correspond to the position of the rows of cylinder holes 12 and tabs 8 on cylinder 13. Threaded screws are inserted into holes 19*a* to removably secure seed duct 14 with strip 9 to device 100. Support 19 is welded to support 33 and 34, located at either end of cylinder 13, which is made of any durable material such as for example mild steel, aluminum, etc. (FIGS. 1,2, and 4*b*) Support 33 is welded to support 37, which is bolted to the short end of L-shaped support 35 (FIGS. 1, 3, and 17).

Figure 16:
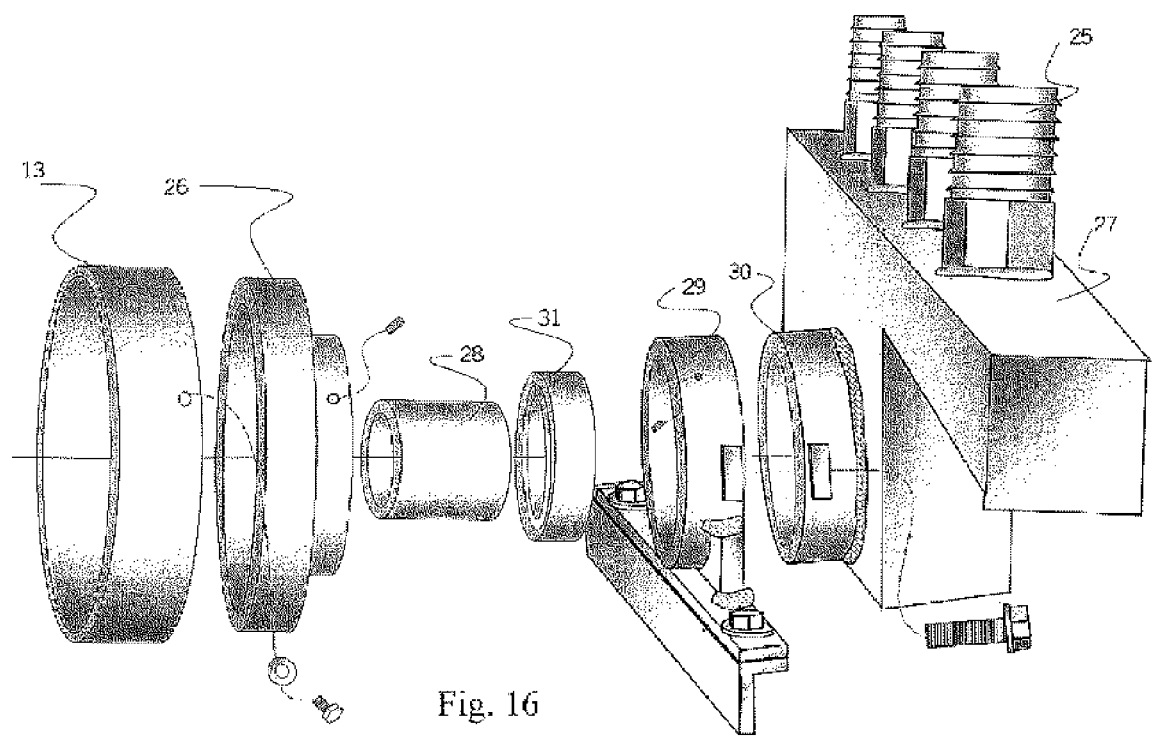
FIG. 16 is a drawing showing an exploded view of vacuum assembly 90 including barbed hose fittings 25, second end cap with end cap housing 26, vacuum chamber manifold 27, vacuum conveying inlet pipe 28, bearing housing 29, vacuum manifold convertor 30 and bearing 31. The drawing also shows a portion of pick-up and transfer cylinder 13.
Figure 18:
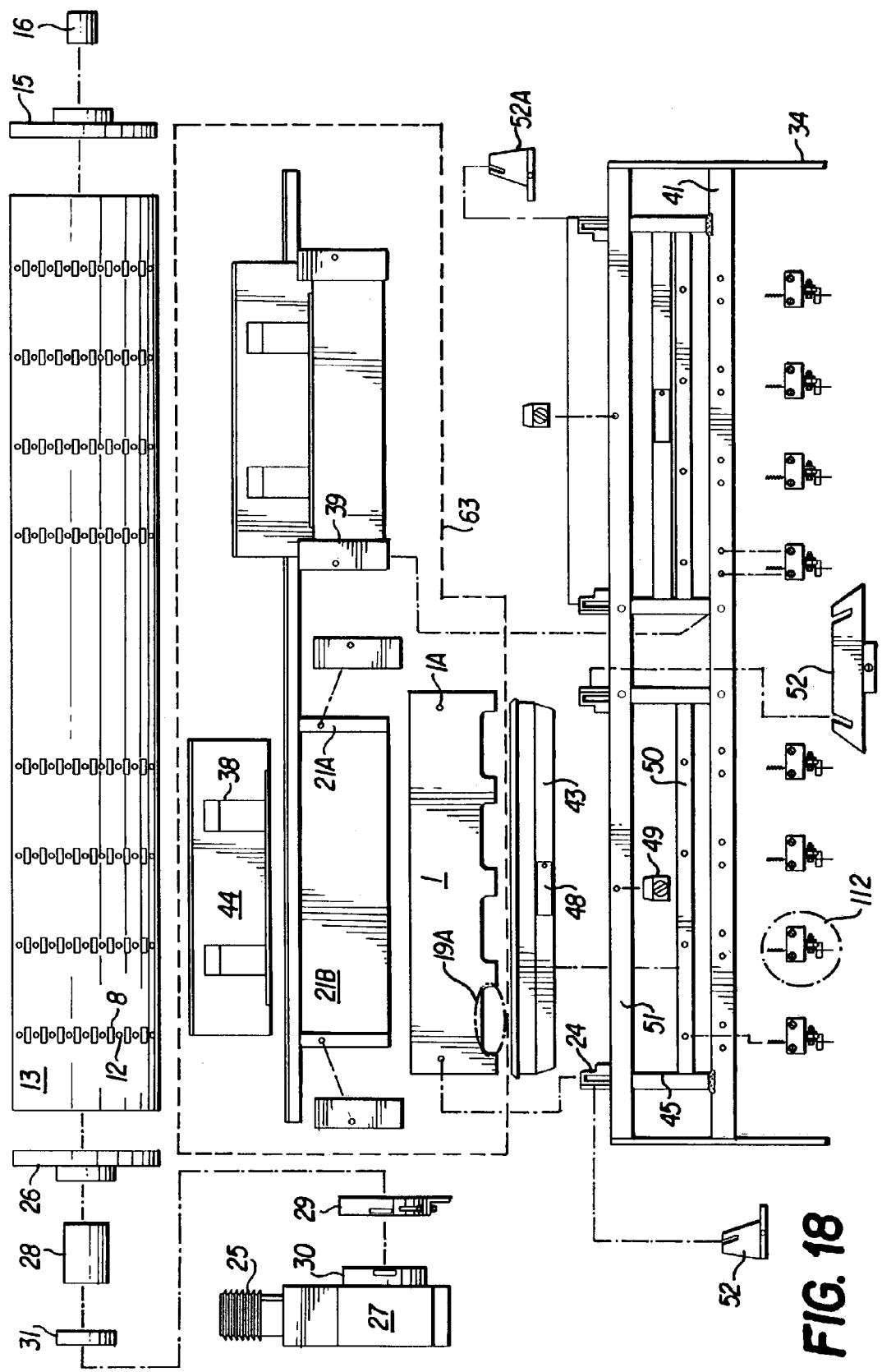
FIG. 18 is a drawing showing an exploded view of FIG. 17 including hole cleaner support 41, hole cleaner support 45, and cleaning unit 112. The drawing further includes primary sliding gate 1, pick-up and transfer cylinder 13, end cap with end cap housing 15, central perpendicular support 21b, perpendicular stationary support 21a, support 24, barbed hose fitting 25, second end cap with end cap-housing 26, vacuum chamber manifold 27, vacuum conveying inlet pipe 28, vacuum manifold convertor 30, bearing 31, support 34, handle 38, bottom plate 43, seed access port 44, seed hopper support 47, seed drain access port 48, thumb screw clamp 49, bottom plate support 50, support 51, and seed hopper transition assembly 63.

For vacuum assembly 90, a second end cap with end cap housing 26 (FIG. 16) is used to plug the other end of pick-up and transfer cylinder 13 in order to retain a vacuum within cylinder 13 and to provide a housing 26 for vacuum conveying inlet pipe 28 (FIGS. 16 and 18). Pipe 28 extends through an opening in second end cap with end cap housing 26. Pipe 28 is secured in housing 26 using a set screw. Bearing 31, which supports vacuum conveying inlet pipe 28, fits over the outside end of pipe 28 and bearing housing 29 fits over bearing 31. Removably attached to bearing housing 29 is an assembly that includes cylinder 13, vacuum inlet pipe 28, vacuum manifold converter 30, vacuum chamber manifold 27, and barbed hose fitting 25. Each of these are welded together to form one piece. Barbed hose fittings 25 are modified from commercially available barbed fittings by being welded to vacuum chamber manifold 27. Vacuum hoses are attached to barbed hose fittings 25 using commercially available hose clamps (not shown). Hoses are routed to a hydraulic- or power-take-off (PTO)-driven vacuum fan. The vacuum fan is usually located directly behind the PTO shaft of the tractor.

Cleaning system 110 removes any seed fragments remaining in cylinder hole 12 that were not dislodged by seed contact dislodging strip 9 of seed detachment system 80 (FIGS. 1, 2, 4b, 5a–c, and 6a–d). System 110 (FIGS. 17–20) includes cleaning unit 112 made up of hole cleaners 53, nut 56, hole cleaner lever arm 59, hole cleaner lever arm spring 58, and cotter pin 54; and hole cleaner lever arm support 57. Hole cleaners 53 can be nails which are welded into holes drilled into the sides of hexagonal-shaped nut 56, one nail per side with the pointed end of the nail extending outward. Cotter pin 54 with hole cleaners 53 and nut 56 are mounted onto hole cleaner lever arm 59 using bolt 55. Arm 59 is a metal bar having holes on either end which accommodate a partially threaded or plain bolt. Cotter pin 54 removably mounts nut 56 with hole cleaners 53 onto one end of hole cleaner lever arm 59 using a bolt 55 and washers 55b (FIG. 20). Bolt 55 has hole 55a through which is inserted cotter pin 54. On the upper edge of arm 59 is a means for removably securing hole cleaner lever arm spring 58a. An example of means 58a is a welded loop of metal. Hole cleaner lever arm spring 58 is threaded through means 58a. Spring 58 is approximately ¹⁄₁₆ inch by 1½ inches and has a tension of about 1.51 pounds/inch. The other end of spring 58 is anchored in hole cleaner spring hole 40 on bottom plate support 50 (FIGS. 8, 9, 17, and 18). Arm 59 is removably mounted onto hole cleaner lever arm support 57 which in turn is removably mounted to hole cleaner support 41 with two threaded bolts, washers, and nuts. The number of cleaning units 112 and supports 57 is equal to the number of rows of tabs 8 and cylinder holes 12 on pick-up and transfer cylinder 13 (FIGS. 1, 17, and 18).

Figure 7A:
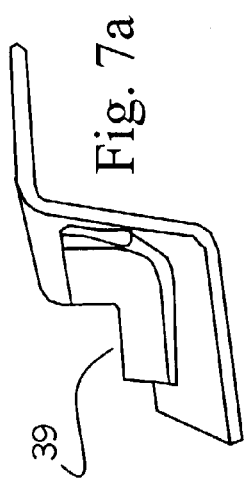
FIGS. 7a–7c show top (7a), side (7b) and front (7c) view of stationary support 39.
Figure 7C:
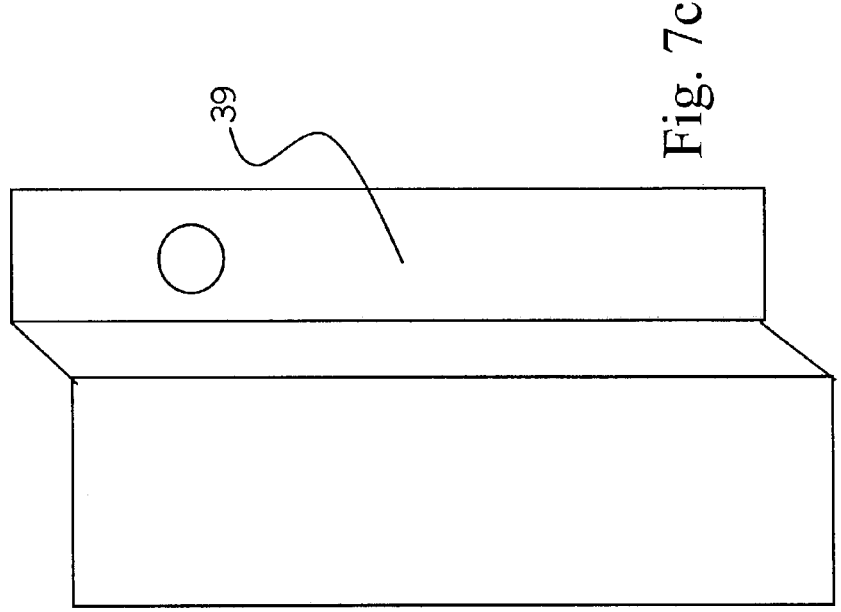
Figure 7B:
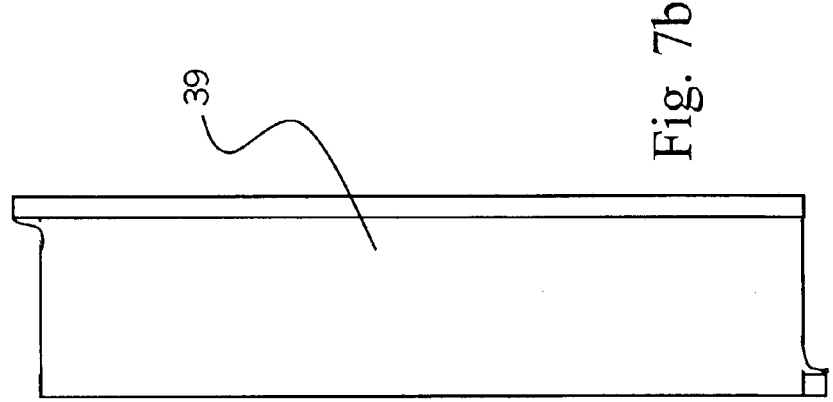
Figure 8:
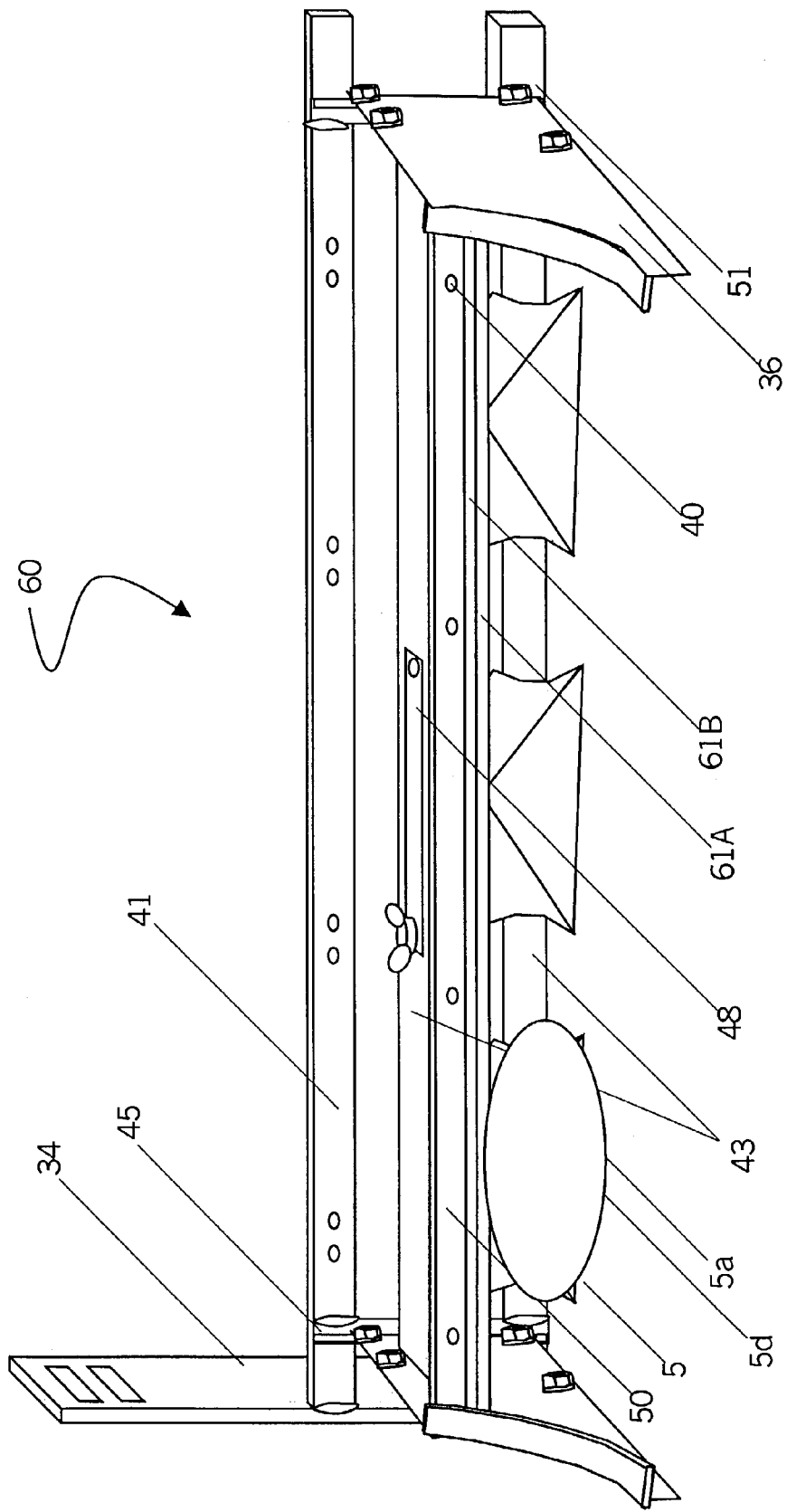
FIG. 8 is a bottom-view drawing showing a detail of part of Hopper assembly 60 including dividers 5 showing side walls 5a and triangular-shaped top 5d, shroud for seed containment 36, bottom plate 43, seed drain access port 48, bottom plate support 50, and seed access support 51, bottom plate brush 61a and bottom plate brush holder 61b; and a part of cleaning system 110 including hole cleaner spring holes 40 and hole cleaner support 41.
Figure 9:
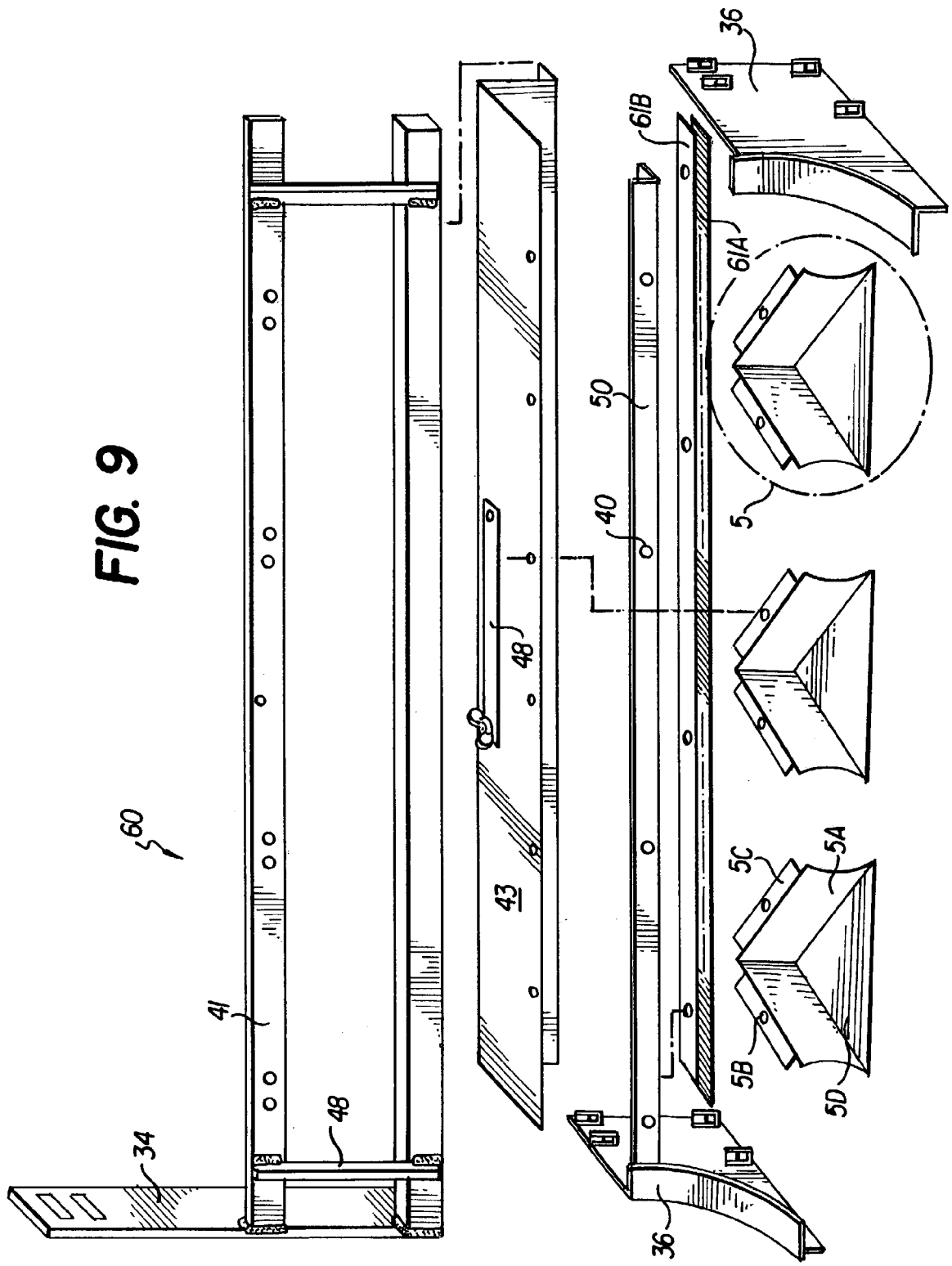
FIG. 9 is an exploded view of FIG. 8 showing Hopper assembly 60 including dividers 5 showing side walls 5a, mounting holes 5b, triangular-shaped top 5d, and flange 5c, shroud for seed containment 36, bottom plate 43, seed drain access port 48, bottom plate support 50, bottom plate brush 61a and bottom plate brush holder 61b; and a part of cleaning system 110 including hole cleaner, spring holes 40, hole cleaner support 41 and 45, and support 34.
Figure 10:
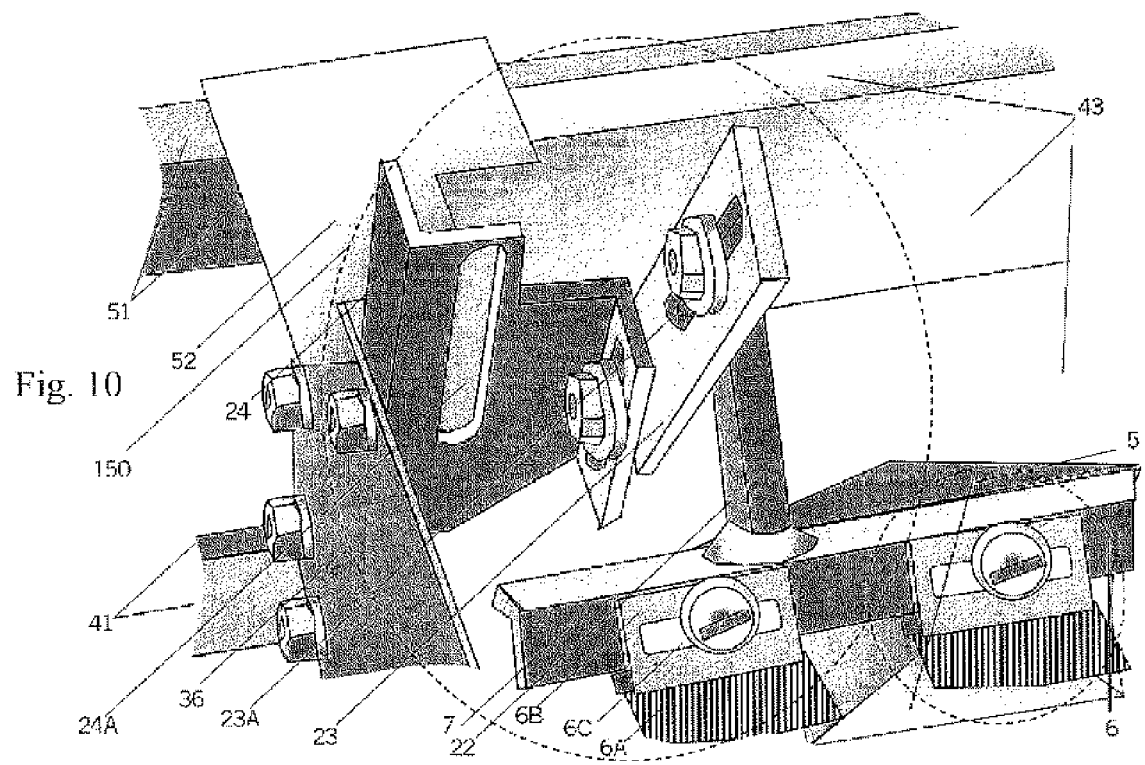
FIG. 10 is a drawing showing seed brush assembly 150 including brush 6 having bristle 6a, frame 6b, slot 6c; brush support 7, support 22, support 23, slot 23a, and support 24. The drawing also shows divider 5, shroud for seed containment 36, hole cleaner support 41, bottom plate 43, seed access support 51, and shroud for seed containment 52.
Figure 11:
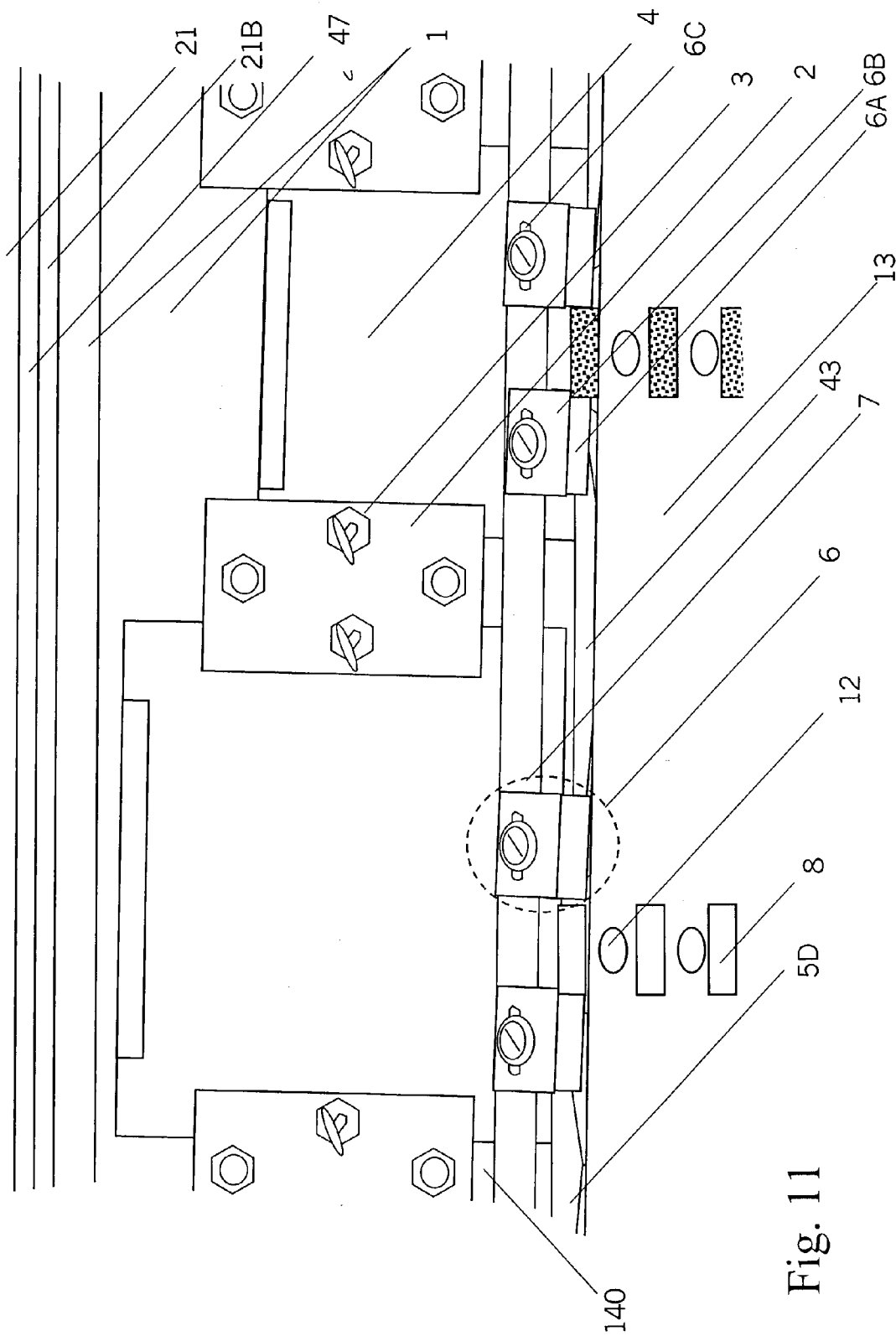
FIG. 11 is a drawing showing baffle assembly 140 including stationary support 2, thumb screws 3, brush 6 including bristle 6a, frame 6b, and slot 6c; brush support 7. The drawing also shows primary sliding gate 1, secondary sliding gate 4, triangular-shaped top 5d of divider 5, tab 8, cylinder holes 12, pick-up and transfer cylinder 13, seed hopper 21, central perpendicular support 21b, bottom plate 43, and seed hopper support 47.
Figure 12:
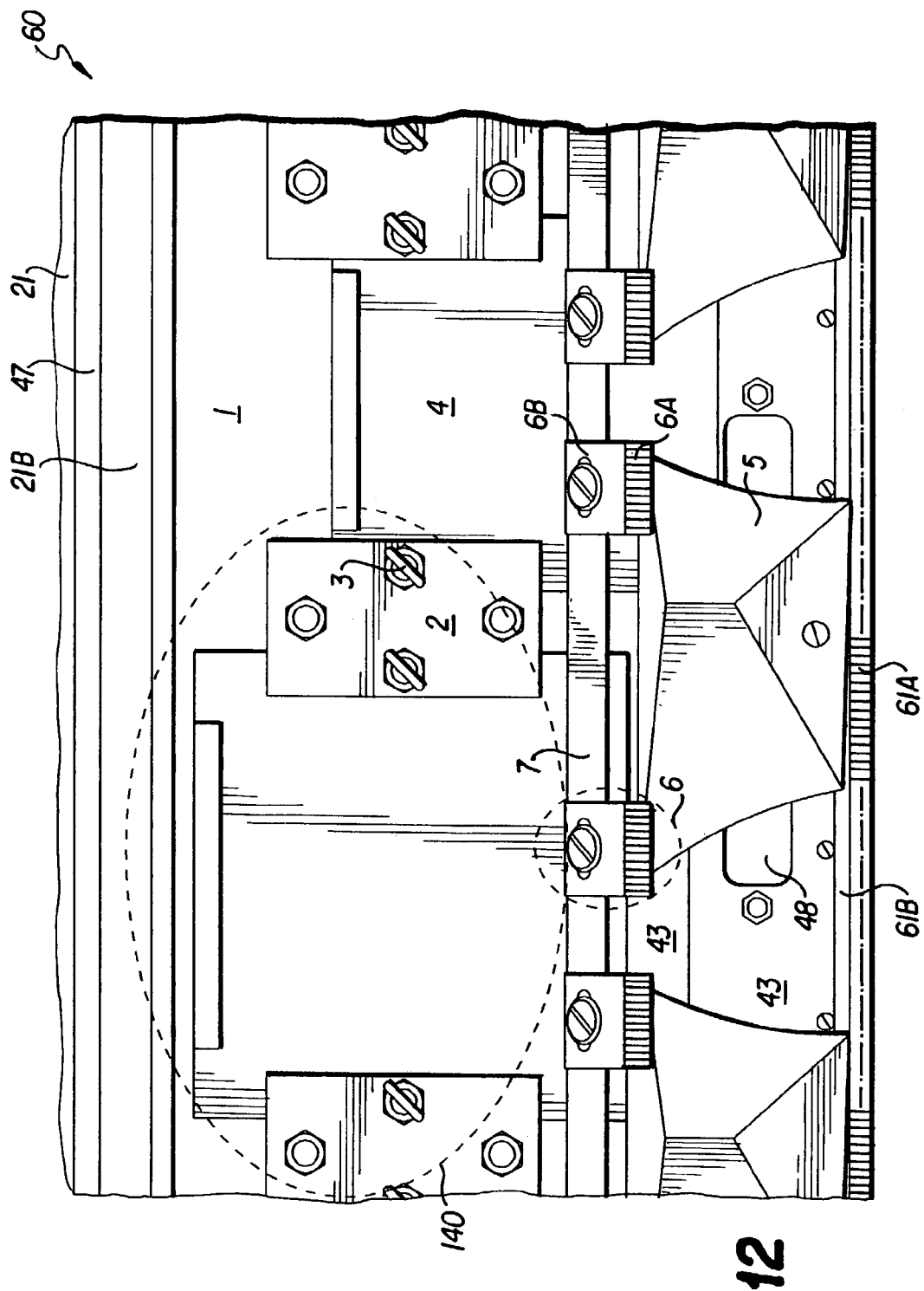
FIG. 12 is a drawing showing baffle assembly 140 and part of hopper assembly 60 that is located behind pick-up and transfer cylinder 13 (not shown). The drawing includes baffle assembly 140 including stationary support 2, thumb screws 3, brush 6 including bristle 6a and frame 6b, and brush support 7. The drawing also shows primary sliding gate 1, secondary sliding gate 4, dividers 5, seed hopper 21, central perpendicular support 21b, bottom plate 43, seed hopper support 47, seed drain access port 48, bottom plate brush 61a, and bottom plate brush holder 61b.
Figure 13:
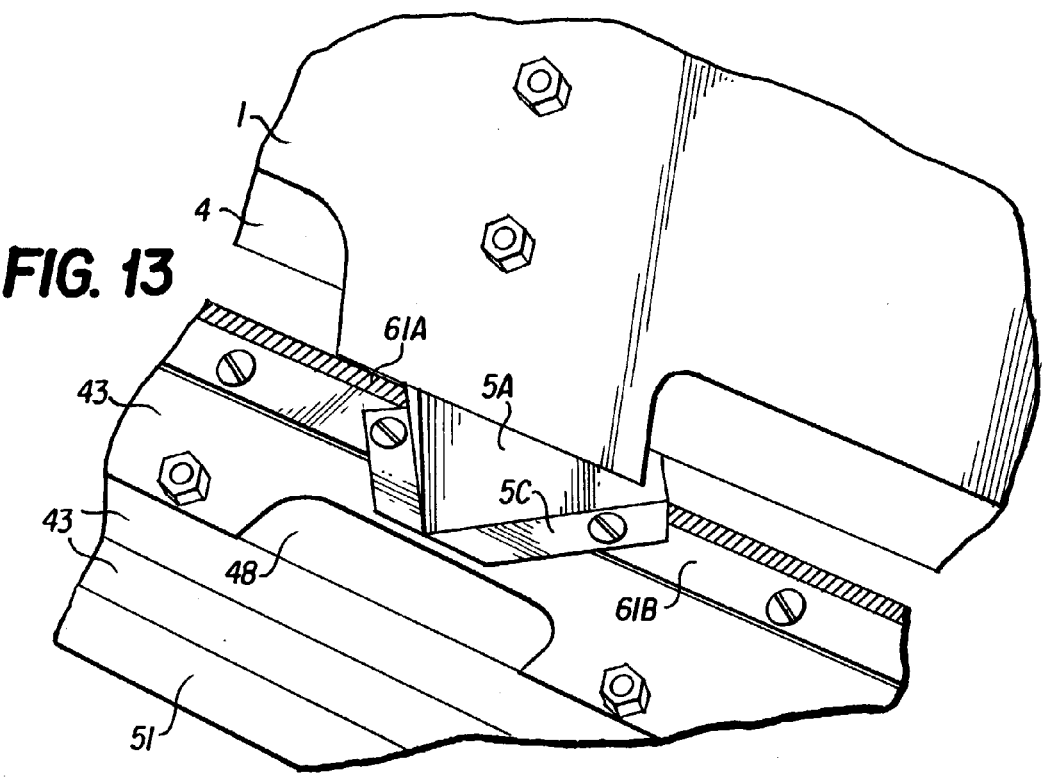
FIG. 13 is a drawing showing the back of a divider 5 and its relationship to the other components of hopper assembly 60. The drawing includes primary sliding gate 1, secondary sliding gate 4, divider side wall 5a, divider flange 5c, bottom plate 43, seed drain access port 48, support 51, bottom plate brush 61a, and bottom plate brush holder 61b.
Figure 14:
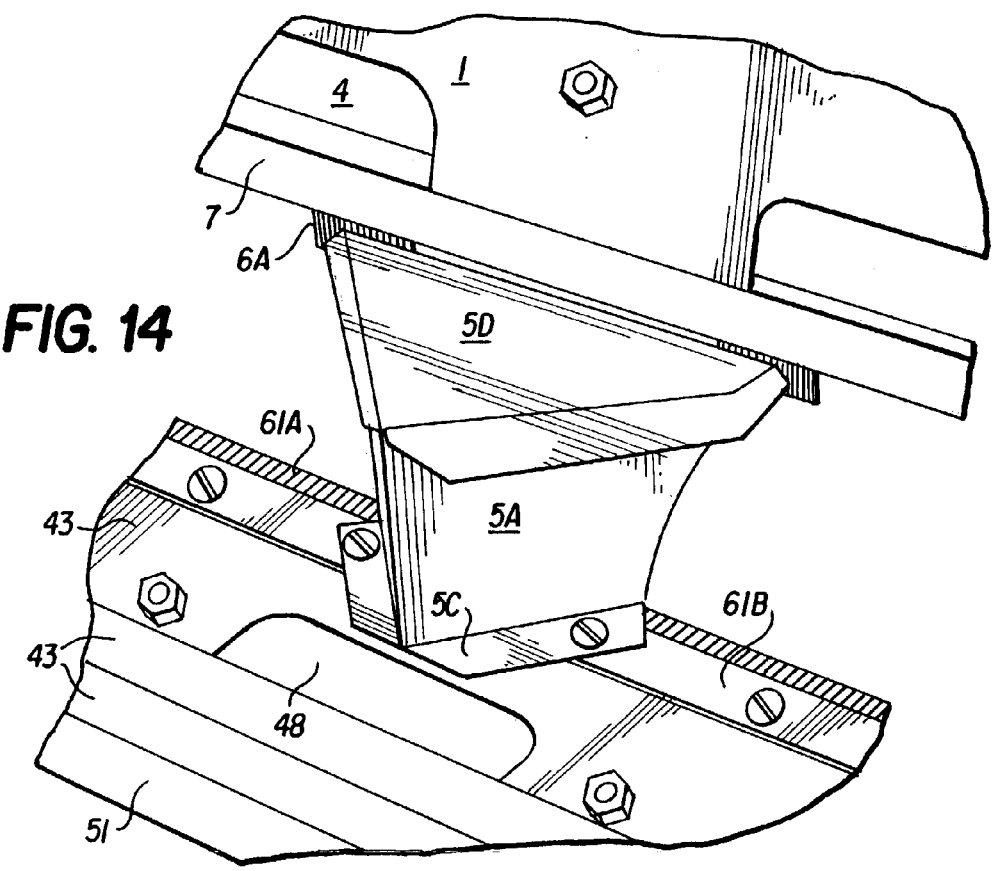
FIG. 14 is a partially exploded view showing the back of divider 5 to show its relationship to a portion of brushes 61a and 6a. The drawing includes primary sliding gate 1, secondary sliding gate 4, divider side wall 5a including divider flange 5c, brush bristle 6a, brush support 7, bottom plate 43, seed drain access port 48, support 51, bottom plate brush 61a, and bottom plate brush holder 61b.
Figure 17:
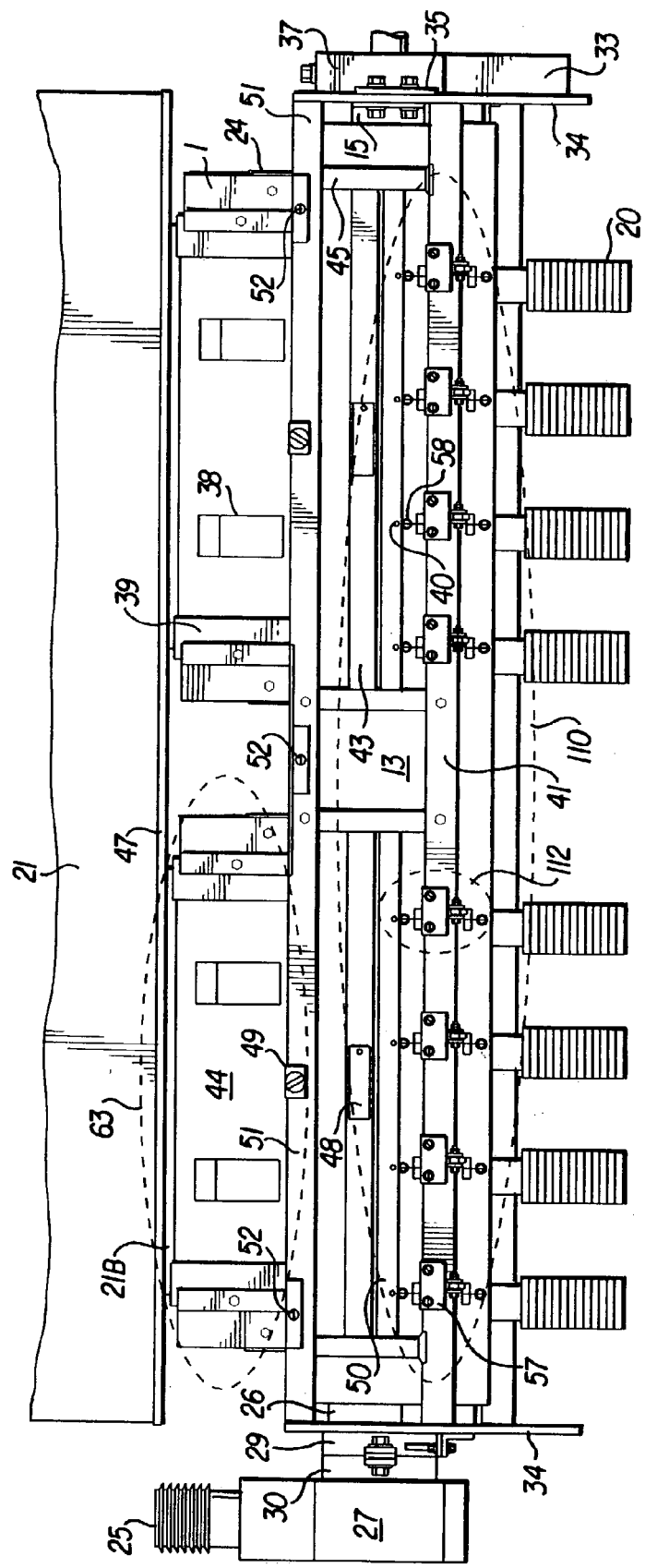
FIG. 17 is a drawing showing cleaning system 110. The drawing includes hole cleaner spring holes 40, hole cleaner support 41, hole cleaner support 45, hole cleaner lever arm support 57, hole cleaner lever arm spring 58, and cleaning unit 112 of system 110. The drawing further includes primary sliding gate 1, pick-up and transfer cylinder 13, end cap with housing 15, seed drop tube 20, seed hopper 21, central perpendicular support 21b, support 24, barbed hose fitting 25, second end cap with housing 26, vacuum chamber manifold 27, bearing housing 29, vacuum manifold convertor 30, support 33, support 34, L-shaped support 35, support 37, handle 38, stationary support 39, bottom plate 43, seed access port 44, seed drain access port 48, thumb screw clamp 49, support 51, and seed hopper transition assembly 63.

Hopper assembly 60 (FIG. 1) includes seed hopper 21, central perpendicular supports 21b (FIG. 2) and perpendicular stationary supports 21a (FIG. 1), baffle and brush system 121 (FIG. 2), seed access port 44 (FIG. 17), shrouds for seed containment 52 and 36 (FIG. 1), and seed drain access port 48 (FIGS. 8, 9, 12–14, and 17–18). Seed hopper 21 is a conventional seed hopper which runs the length of cylinder assembly 70 and sits partially over cylinder assembly 70 (FIGS. 1–4a, 8,11, and 17–18). Seed hopper 21 has been modified to include a stationary support 39 to clamp down seed access port 44 and handle 38 for removing seed access port 44. Seed hopper 21 has been further modified to include shroud for seed containment 36 and seed hopper support 47 (FIGS. 1–3, 17, and 18). Shroud 36 is approximately 6 inches by 4 inches and is made of any material suitable for containing seeds, such as for example, mild steel, aluminum, etc. There is a shroud 36 on either end of pick-up and transfer cylinder 13. It is generally rectangular in shape, having its outer most end cut to form an arc for fitting partially over the circumference of cylinder 13 (FIGS. 1, 3, and 8–10). Shroud 36 is bolted to hole cleaner support 45 and bottom plate support 50. Shroud 36 prevents seeds from falling out of either end and middle of device 100. Two shrouds for seed containment 52 (FIGS. 1, 10, and 18) are L-shaped and extend forward partially over seed cylinder 13 in order to contain seed within device 100. Shrouds 52 have lip 52a which fits over support 51. Lip 52a attaches to support 51 with a threaded screw. The long end of the L is approximately 3.5 inches while the base of the L is approximately 2 inches. The middle shroud 52 is approximately 7.2 inches by 3.5 inches and is located midway on support 51 so that it aligns near the center of pick-up and transfer cylinder 13. The two end shrouds 52 align with the ends of cylinder 13 (FIGS. 17 and 18). Other modifications to seed hopper 21 includes a seed hopper transition assembly which includes seed hopper support 47, a pair of seed access ports 44, a pair of perpendicular supports 21b, two pairs of perpendicular stationary supports 21a, stationary supports 39, seed drain access port 48, and thumb screw clamp 49. Seed hopper support 47 is made of about ¾ inch angle iron and is approximately 52 inches (FIGS. 1–3, 11, 12, 17 and 18). It includes 2 pairs of perpendicular stationary supports 21a welded at each end and in the middle, and a pair of central perpendicular supports 21b welded to the front of supports 47. Stationary supports 39 (FIGS. 7, 17, and 18) are bolted to supports 21a. Sheet metal supports 21a are trapazoids approximately 5½ inches by 4 inches by 1½ inches with bent edges of about ½ inch by 3 inches for bolting down stationary supports 39 against seed access ports 44. Supports 39 are approximately 1¾ inches by 3½ inches by 1½ inches (FIGS. 7a–7c). Two seed access ports 44 are made of galvanized sheet metal and are approximately 3 inches by 18 inches. They are removably attached to support 47 using supports 39 bolted to support 21a. Ports 44 slide into supports 39 to keep seed contained in the hopper-to-cylinder transition. Ports 44 each have two tack-welded handles 38 for removing ports 44. Handles 38 can be of any size or shape, determination of which is well within the ordinary skill in the art. Seed drain access port 44 is inserted into strationary support 39 to channel seed from seed hopper 21 to seed dividers 5 mounted to the top of bottom plate 43. To facilitate seed removal after planting is complete, thumb-screw clamps 49 may be loosened and the seed drain access ports 44 removed.

Hopper assembly 60 further includes a series of baffles and brushes to control seed flow (FIGS. 1–3, and 10–12). Baffle and Brush system 121 (FIG. 2) controls seed flow to pick-up and transfer cylinder 13 and keeps seed from riding cylinder 13 where there are no cylinder holes 12 (FIG. 3). For every row of tabs 8 and cylinder holes 12 on pick-up and transfer cylinder 13, there are two baffling means and two brushes.

The baffling means are two large primary sliding gates 1 and eight secondary sliding gates 4. System 121 also includes ten stationary supports 2 for sliding gates 1 and 4, and six dividers 5 (FIGS. 1–3). Two primary sliding gates 1 provide a primary control point for regulating seed flow to pick-up and transfer cylinder 13 (FIGS. 1–3, 11–14, 17, and 18). Primary sliding gates 1 are made of any material suitable for providing seed flow control, such as for example, galvanized sheet metal, aluminum, plastic, etc. Each gate 1 is approximately 23 inches by 5¼ inches and they are bolted to support 24 (FIGS. 1–3). Primary sliding gates 1 are arranged side by side covering the length of pick-up and transfer cylinder 13. Primary sliding gate 1 has two holes 1a at each end for inserting fastening means such as threaded bolts to secure primary sliding gate 1 to support 24 (FIGS. 1–3, 11–14, and 18). The size and shape of the two holes is dependent on the fastening means, determination of which is well within the ordinary skill in the art. Secondary sliding gates 4 are removably mounted onto gates 1 covering the two holes 1a in gates 1 (FIGS. 11–14 and 18). Stationary supports 2 are placed on either side and overlapping the two outside edges of secondary sliding gates 4 after they have been properly positioned for optimum seed flow to pick-up and transfer cylinder 13 and are tightened against gates 4 using thumb screws 3. The openings in supports 2 have nuts welded to them so that tightening thumb screws 3 in the nuts will securely clamp secondary sliding gates 4 in place. Stationary supports 2 are approximately 1.5 inches by about 3 inches and are made of any material suitable to clamp gates 4 in place, such as for example, galvanized sheet metal, plastic, aluminum, etc. Each secondary sliding gate 4 vertical position will differ according to seed flow coming out from the corresponding hole in primary gates 1. The horizontal position of the center line of each secondary sliding gate 4 aligns with the center line of holes spanning the circumference of cylinder 13. In other words, the centerline of each row of holes is also the centerline of secondary sliding gate 4. Positioning of gates 1 and 4 will be described below.

Divider 5 is attached by sheet metal screws to bottom plate 43 (FIGS. 3, 8, 9, and 12–14) to guide seeds to pick-up and transfer cylinder 13. Dividers 5 are located between all interior pairs of brushes 6. Dividers 5 form a wedge with the pointed end facing toward the seed hopper 21 and is positioned directly below three interior stationary supports 2 for secondary sliding gates 4. The wide, non-pointed end of divider 5 faces pick-up and transfer cylinder 13 and is curved to match the curvature of cylinder 13. Divider 5 is triangular in shape. Side walls 5a have flanges 5c which face outwardly. Outward facing flanges 5c have holes 5b for fastening means to mount divider 5 to bottom plate 43. Dividers 5 have two side walls 5a each with surfaces to match the surface of cylinder 13. Side walls 5a are approximately 3 inches by about 2 inches. The curved edges of both divider side walls 5a nearly touch the surface of cylinder 13. Seeds are thereby guided to cylinder holes 12 by the baffling effect of side walls 5a. The divider base is open and triangular-shaped and is approximately 3 inches by about 1½ inches. Triangular top 5d is tack-welded on side walls and is approximately 5 inches by about 2 inches. Dividers 5 are made of any suitable material to channel seeds from hopper 21 to seed cylinder 13, such as for example, galvanized sheet metal, aluminum, plastic, etc. Openings between dividers are where seeds flow to cylinder 13.

Seed brush assembly 150 includes slidable brushes 6 and supports 7,22,23 and 24 (FIG. 10) There are two slidable brushes 6 per row of tabs 8 and cylinder holes 12 on pick-up and transfer cylinder 13 wherein each brush 6 is positioned on either side of the cylinder 13 row. Brushes 6 help to divert seed flow to cylinder holes 12 and knock off any seed riding on pick-up and transfer cylinder 13 but not on a cylinder hole 12 back into the seed pool at the base of primary sliding gate 1. Brushes 6 are modified commercial brushes such as those used for shielding or closing gaps (Sealeze, Richmond, Va.; for example). The precut bristle 6a is approximately 1"×½". Interior frames 6b for holding the width of bristles 6a are approximately 1 inch. A pair of about ½ inch by 1½ inch exterior brushes are mounted to brush support 7 for attaching nylon brushes 6. There are a pair of these for every row of cylinder holes 12. Frame 6b for holding bristles 6a contains slot 6c which allows bristles 6a to be adjusted horizontally. Frame 6b is removably attached to brush support 7 using any means for attachment, such as for example, a threaded screw, washers, and a nut. A support 22 is welded to each end of brush support 7 (FIG. 3). Support 7 is made of ½ inch angle iron and is approximately 23 inches and can be made of any material suitable for attaching brush frame 6b, such as for example, mild steel, aluminum, plastic, etc. Support 22 has a hole 22a located approximately ½ inch from the top of support 22. A threaded screw with washer and a nut removably attaches support 22 to support 23. Support 23 is approximately 1 inch by about 4 inches and is made of any suitable material for attaching supports 22 and 7, and brushes 6, such as for example, mild steel, aluminum, plastic, etc. Support 23 includes slot 23a of approximately ½ inch by 2¼ inches and hole (not shown) which is located at the lower end of support 23. Support 22 attaches to support 23 through slot 23a. The overall height of brush assemblies 6 can be adjusted by moving support 22 along slot 23a and the pivot created where support 23 bolts to the slot in support 24. Support 23 removably attaches to support 24 through hole 23b located below slot 23a. A Threaded screw, washer, and nut is inserted through a hole (not shown) in bracket 24 and fastened with washers and nuts at the back of support 23 to form seed brush assembly 150. Assembly 150 is mounted to the outside edges of primary sliding gate 1 (FIGS. 3 and 10) and to the shroud for seed containment 36 by two threaded bolts and nuts. Bottom plate brush 61a (FIG. 8) prevents seeds from falling out of the planter by acting as a flexible, impenetrable interface between bottom plate 43 and cylinder 1. Brush 61 covers the entire width of bottomplate 43 and is held in place by bottom plate brush holder 61b which is attached to bottom plate 43 by sheet metal screws. Other forms of attachment are well within the ordinary skill in the art.

In operation, the farmer chooses the population he wishes to plant and changes drive wheel-to-cylinder sprockets to match the desired population. Sprockets, gears, and ground speed will control the rotational speed of pick-up and transfer cylinder 13. Next, seed hopper 21 is filled and primary sliding gates 1 are raised until seed flow to cylinder 13 exceeds the minimum flow required to replenish the seed pickup and delivery rate. In practice, primary gates 1 are set by: (1) engaging the vacuum mechanism (not shown), (2) driving the tractor forward at a normal planting speed, (3) observing and adjusting primary gates 1, and (4) bolting down primary sliding gate 1. Next, secondary gates 4 are adjusted by repeating steps 1–3 above until a seed profile approximately 1 inch to 2 inches above the horizontal centerline of the pickup side of the cylinder 13 can be maintained while planting. Thumb screws (wing bolts) 3 are then tightened to keep secondary sliding gates 4 in place. After the adjustments are finished, device 100 is pulled in a forward direction and seeds are planted in a uniform, staggered, diamond-shaped pattern (FIGS. 22, 23c, and 24c).

The foregoing detailed description is for the purpose of illustration. Such detail is solely for that purpose and those skilled in the art can make variations without departing from the spirit and scope of the invention.

INDEX OF THE ELEMENTS

1. Primary Sliding Gate
1a. Opening
1b. Holes
2. Stationary Support
3. Thumb screw (Wing Bolt)
4. Secondary Sliding Gate
5. Divider
5a. Side Wall
5b. Mounting Holes
5c. Divider Flange
5d. Triangular-Shaped top
6. Brush
6a. Bristle
6b. Frame
6c. Slot
7. Brush Support
8. Tab
9. Seed Contact Dislodging Strip
10. Strip Support
10a. Slot
11. Triangular-shaped Strip Support
11a. Notch
11b. Thread hole 12. Cylinder Hole
12a. Peanut Grommet
12b. Soy Bean Grommet
12c. Cotton Grommet
12d. Plug grommet
13. Pick-Up and Transfer Cylinder
14. Seed duct
15. End cap with end cap housing
16. Drive Shaft
17. Bearing
18. Bearing Housing
18a. Housing Holes
19. Support
19a. Holes
20. Seed Drop Tube
21. Seed Hopper
21a. Perpendicular Stationary Support
21b. Central Perpendicular Support
22. Support
22a. Hole
23. Support
23a. Slot
23b Hole
24. Support
24a. Bracket
25. Barbed hose Fitting
26. Second End Cap with End Cap Housing
27. Vacuum Chamber Manifold
28. Vacuum Conveying Inlet Pipe
29. Bearing Housing
30. Vacuum Manifold Convertor
31. Bearing
32. Mounting Support
33. Support
34. Support
35. L-Shaped Support
36. Shroud for Seed Containment
37. Support
38. Handle
39. Stationary Support
40. Hole Cleaner Spring Hole
41. Hole Cleaner Support
43. Bottom Plate
44. Seed Access Port
45. Hole Cleaner Support
47. Seed Hopper Support
48. Seed Drain Access Port
49. Thumb Screw Clamp
50. Bottom Plate Support
51. Support
52. Shroud for Seed Containment
52a. Lip
53. Hole Cleaner
54. Cotter Pin
55. Bolt
55a. Hole
55b. Washers
56. Nut
57. Hole Cleaner Lever Arm Support
58. Hole Cleaner Lever Arm Spring
58a. Means for Removably Securing Hole Cleaner Lever Arm Spring
59. Hole Cleaner Lever Arm
60. Hopper Assembly
61a. Bottom Plate Brush

What is claimed is:

1. A device for planting seeds in a diamond-shaped pattern comprising:
   a. a hopper assembly comprising a baffle and brush system for controlling seed flow to a pick-up and transfer cylinder operatively connected to said pick-up and transfer cylinder,
   b. a cylinder assembly comprising said pick-up and transfer cylinder having a plurality of cylinder holes arranged in rows operatively connected to said hopper assembly,
   c. a seed detachment system operatively connected to said cylinder to dislodge seeds from said cylinder holes, and
   d. a cleaning system operatively connected to said cylinder for removing seed fragments remaining in said cylinder holes after seed are dislodged by said detachment system.

2. The device of claim 1 wherein said hopper assembly further includes a seed hopper wherein said hopper includes shrouds for seed containment that are operatively connected to said pick-up and transfer cylinder and said hopper.

3. The device of claim 1 wherein said hopper assembly further includes a seed hopper transition assembly including a pair of seed access ports and a seed drain access port operatively connected to said hopper and said pick-up and transfer cylinder.

4. The device of claim 1 wherein said baffle and brush system includes baffling means operatively connected to said hopper assembly and said pick-up and transfer cylinder for regulating seed flow to said cylinder.

5. The device of claim 4 wherein said baffling means includes primary sliding gates and secondary sliding gates.

6. The system of claim 4 wherein said baffle and brush system includes dividers operatively connected to said cylinder to guide seeds to said cylinder.

7. The system of claim 1 wherein said baffle and brush system includes a seed brush assembly operatively connected to said pick-up and transfer system for diverting seeds from said baffling means to cylinder holes on said cylinder and for removing seeds not on said cylinder holes that are riding on said cylinder.

8. The device of claim 1 wherein said pick-up and transfer cylinder further includes a plurality of tabs operatively connected to said cylinder holes to improve seed flow to said holes.

9. The device of claim 1 further including a vacuum assembly operatively connected to said cylinder assembly for facilitating seed transfer to said cylinder holes.

10. The device of claim 1 wherein said seed detachment system includes a plurality of seed contact dislodging strips operatively connected to said pick-up and transfer cylinder for dislodging seeds held by a vacuum in said cylinder holes.

11. The device of claim 1 wherein said cleaning system includes a plurality of cleaning units operatively attached to said pick-up and transfer cylinder wherein each of said units includes a hexagonal-shaped nut having attached hole cleaners to each side of said nut.

12. A device for planting seeds in a diamond-shaped pattern comprising:
   a. a hopper assembly comprising a baffle and brush system for controlling seed flow to a pick-up and transfer cylinder operatively connected to said pick-up and transfer cylinder,
   b. a cylinder assembly comprising a pick-up and transfer cylinder having a plurality of cylinder holes arranged in rows operatively connected to said hopper assembly, c. a vacuum assembly operatively connected to said cylinder assembly for facilitating seed transfer to said cylinder holes,
d. a seed detachment system operatively connected to said cylinder to dislodge seeds from said cylinder holes, and
e. a cleaning system operatively connected to said cylinder for removing seed fragments remaining in said cylinder holes after seed are dislodged by said detachment system.

* * * * *